US012420451B1

(12) United States Patent
Karam et al.

(10) Patent No.: US 12,420,451 B1
(45) Date of Patent: Sep. 23, 2025

(54) VOLUMETRIC CONCRETE MIXING SYSTEM, EQUIPMENT, AND METHOD

(71) Applicant: J&P Invesco LLC, Schertz, TX (US)

(72) Inventors: Paul A. Karam, San Antonio, TX (US); Henry J. Karam, Golden Ridge, TX (US); Gabriel J. Leyva, San Antonio, TX (US); Stanley R. Peters, Castle Rock, CO (US); David S. Zuniga, San Antonio, TX (US); Carlos Medina, San Antonio, TX (US)

(73) Assignee: J&P Invesco LLC, Schertz, TX (US)

( * ) Notice: Subject to any disclaimer, the term of this patent is extended or adjusted under 35 U.S.C. 154(b) by 0 days.

(21) Appl. No.: 18/506,302

(22) Filed: Nov. 10, 2023

Related U.S. Application Data

(60) Continuation of application No. 17/450,021, filed on Oct. 5, 2021, now Pat. No. 11,850,769, which is a
(Continued)

(51) Int. Cl.
*B28C 9/00* (2006.01)
*B01F 27/192* (2022.01)
(Continued)

(52) U.S. Cl.
CPC ........ *B28C 9/0463* (2013.01); *B01F 27/1921* (2022.01); *B28C 5/0818* (2013.01);
(Continued)

(58) Field of Classification Search
CPC ... B28C 9/0463; B28C 5/0818; B28C 5/0887; B28C 5/0893; B01F 27/1921; E02F 5/223
See application file for complete search history.

(56) References Cited

U.S. PATENT DOCUMENTS

| | | | |
|---|---|---|---|
| 69,611 | A | 10/1867 | Ballard |
| 430,575 | A | 6/1890 | Griffin |

(Continued)

FOREIGN PATENT DOCUMENTS

| | | |
|---|---|---|
| EP | 1103533 | 5/2001 |
| GB | 2158491 | 5/1985 |

OTHER PUBLICATIONS

Bay Lynx Website, "Bay-Lynx Develops Game-Changing Grout Mixer", found online at: https://bay-lynx. com/news/bay-lynx-develops-game-changing-grout-mixer/, May 15, 2018, 4 pages.

(Continued)

*Primary Examiner* — Anshu Bhatia
(74) *Attorney, Agent, or Firm* — Merchant & Gould P.C.

(57) ABSTRACT

A mobile volumetric concrete mixing system includes a suction system that vacuums up trench spoils while a trench is being cut. These trench spoils are then screened on-site for particle size to be reused and mixed with water, cement, and/or other admixtures at an auger mixer to form a backfill mixture. This backfill mixture may then be loaded into a hopper that continuously agitates the mixture so that the mixture does not harden before pouring. The agitating hopper is coupled to a discharge chute of the auger mixer and includes one or more augers disposed at various orientations that the backfill mixture is channeled through. From the agitating hopper, the backfill mixture is channeled to an applicator that moves along the trench and that enables the mixture to be quickly poured into the trench with little clean-up required.

18 Claims, 22 Drawing Sheets

Related U.S. Application Data continuation of application No. 16/559,987, filed on Sep. 4, 2019, now Pat. No. 11,173,630, which is a division of application No. 15/804,679, filed on Nov. 6, 2017, now Pat. No. 10,688,687.

(60) Provisional application No. 62/526,273, filed on Jun. 28, 2017, provisional application No. 62/497,052, filed on Nov. 8, 2016.

(51) Int. Cl.

| | |
|---|---|
| ***B28C 5/08*** | (2006.01) |
| ***B28C 5/12*** | (2006.01) |
| ***B28C 5/14*** | (2006.01) |
| ***B28C 5/16*** | (2006.01) |
| ***B28C 9/04*** | (2006.01) |
| ***E01C 23/06*** | (2006.01) |
| ***E01C 23/09*** | (2006.01) |
| *E02F 5/22* | (2006.01) |

(52) U.S. Cl.

CPC .......... *B28C 5/0887* (2013.01); *B28C 5/0893* (2013.01); *B28C 5/1246* (2013.01); *B28C 5/143* (2013.01); *B28C 5/16* (2013.01); *B28C 9/002* (2013.01); *B28C 9/0481* (2013.01); *E01C 23/065* (2013.01); *E01C 23/0933* (2013.01); *E01C 23/096* (2013.01); *E01C 2301/50* (2013.01); *E02F 5/223* (2013.01)

(56) References Cited

U.S. PATENT DOCUMENTS

| | | | | |
|---|---|---|---|---|
| 1,012,612 | A | | 12/1911 | Da Vier |
| 1,545,167 | A | | 7/1925 | Optiz |
| 3,024,930 | A | | 3/1962 | Sims |
| 3,043,200 | A | | 7/1962 | Huttash |
| 3,111,335 | A | | 11/1963 | Hickman |
| 3,130,652 | A | | 4/1964 | Newton, Sr. |
| 3,469,824 | A | | 9/1969 | Futty |
| 3,572,652 | A | | 3/1971 | Hale |
| 3,580,147 | A | | 5/1971 | Kaltenegger |
| 3,623,708 | A | | 11/1971 | Futty |
| 3,820,914 | A | | 6/1974 | Zimmerman |
| 4,036,564 | A | | 7/1977 | Richards |
| 4,085,976 | A | | 4/1978 | Edwards |
| 4,211,491 | A | | 7/1980 | Chaney |
| 4,437,766 | A | | 3/1984 | Joachim |
| 4,630,965 | A | | 12/1986 | Nguyen |
| 4,781,556 | A | | 11/1988 | Paul |
| 5,609,836 | A | | 3/1997 | McManus |
| 5,667,298 | A | | 9/1997 | Musi |
| 5,795,060 | A | | 8/1998 | Stephens |
| 5,971,656 | A | | 10/1999 | Kitsmiller |
| 6,109,826 | A | | 8/2000 | Mertes |
| 6,138,837 | A | * | 10/2000 | Santa Cruz ............ E02F 7/026 209/325 |
| 6,290,428 | B1 | | 9/2001 | Hall |
| 6,439,806 | B1 | | 8/2002 | Dillingham |
| 6,942,717 | B2 | | 9/2005 | Armstrong |
| 7,080,955 | B2 | | 7/2006 | Gregg |
| 7,255,512 | B2 | | 8/2007 | Wallace |
| 7,410,322 | B1 | | 8/2008 | Wallace |
| 8,747,547 | B1 | | 6/2014 | Peters et al. |
| 8,882,905 | B1 | | 11/2014 | Peters et al. |
| 9,376,343 | B2 | | 6/2016 | Hernandez et al. |
| 9,486,938 | B2 | | 11/2016 | Pino |
| 9,816,237 | B2 | | 11/2017 | Loomis |
| 10,443,211 | B2 | | 10/2019 | Karam et al. |
| 10,571,045 | B2 | | 2/2020 | Pino, Jr. et al. |
| 10,571,047 | B2 | | 2/2020 | Pino, Jr. et al. |
| 10,583,581 | B2 | | 3/2020 | Hernandez |
| 10,641,414 | B2 | | 5/2020 | Pino, Jr. et al. |
| 10,688,687 | B2 | | 6/2020 | Karam |
| 11,168,460 | B1 | | 11/2021 | Karam |
| 11,173,630 | B1 | | 11/2021 | Karam |
| 11,850,769 | B1 | | 12/2023 | Karam |
| 12,173,471 | B1 | | 12/2024 | Karam |
| 2003/0076737 | A1 | | 4/2003 | Grassi |
| 2003/0142579 | A1 | | 7/2003 | Throop |
| 2006/0117612 | A1 | * | 6/2006 | Maybury ............... E02F 5/003 37/304 |
| 2007/0171764 | A1 | | 7/2007 | Klein |
| 2016/0138810 | A1 | | 5/2016 | Owen |
| 2016/0145831 | A1 | * | 5/2016 | Dermody ................. F16L 1/06 37/142.5 |
| 2016/0257620 | A1 | | 9/2016 | Peters et al. |
| 2017/0080601 | A1 | | 3/2017 | Hernandez |
| 2017/0268184 | A1 | | 9/2017 | Loomis |
| 2018/0016099 | A1 | | 1/2018 | Workman |
| 2018/0016756 | A1 | | 1/2018 | Beckman |
| 2018/0038071 | A1 | | 2/2018 | Jurgens |
| 2018/0106015 | A1 | | 4/2018 | Pino et al. |
| 2018/0126592 | A1 | | 5/2018 | Karam |
| 2018/0156357 | A1 | | 6/2018 | Pino et al. |
| 2018/0313059 | A1 | | 11/2018 | Karam et al. |
| 2020/0149659 | A1 | | 5/2020 | Pino, Jr. et al. |
| 2020/0149660 | A1 | | 5/2020 | Pino, Jr. et al. |
| 2020/0164543 | A1 | | 5/2020 | Hernandez |
| 2020/0181877 | A1 | | 6/2020 | Radnich |
| 2020/0200292 | A1 | | 6/2020 | Pino, Jr. et al. |
| 2020/0406501 | A1 | | 12/2020 | Hernandez |

OTHER PUBLICATIONS

Concreteproducts.com, "Mixer measures up to grout, flowable fill production", Aug. 2018, 1 page.

* cited by examiner

VOLUMETRIC CONCRETE MIXING SYSTEM, EQUIPMENT, AND METHOD

RELATED APPLICATIONS

This application is a continuation of U.S. patent application Ser. No. 17/450,021, now U.S. Pat. No. 11,850,769, filed Oct. 5, 2021, which is a continuation of U.S. patent application Ser. No. 16/559,987, now U.S. Pat. No. 11,173,630, filed Sep. 4, 2019, which is a division of U.S. patent application Ser. No. 15/804,679, now U.S. Pat. No. 10,688,687, filed Nov. 6, 2017, which claims the benefit of U.S. Provisional Application No. 62/526,273, filed Jun. 28, 2017, entitled "Pressurized Backfill Placing Machine and Methods for Nano-Trenches Backfilling," and claims the benefit of U.S. Provisional Application No. 62/497,052, filed Nov. 8, 2016, entitled "Truck-Chute-Mounted, Continuous-Agitation Grout Hopper," the entire disclosures of which are incorporated herein by reference in their entireties. To the extent appropriate, a claim of priority is made to each of the above disclosed applications.

INTRODUCTION

Installation of cables and conduits, for example, fiber optic communication cables or other utility cables, under road or walkway surfaces typically involves the excavation of small trenches (sometimes referred to as nano or micro trenches) through existing pavement materials and subgrade. The desired cable or conduit may then be installed and afterwards the trench is backfilled up to the layer of pavement structure with a flowable backfill. The flowable backfill can be produced with new commercial aggregate; however, the trench spoils that are excavated must then be collected and transported away. Backfill mixes have been developed to reuse the excavated trench spoils as aggregate in the mix, but the collection and off-site screening have been too time consuming and costly to effectively and efficiently introduce in the industry.

Some known flowable fill mixtures for backfilling micro trenches are rapid-setting and use fly ash as an admixture; although the availability of fly ash is decreasing as coal-fired electric power plants decline in operation. As such, new style rapid-setting mixes based on readily available Portland cement are being developed. However, due to the rapid setting nature of the mixture, continuous agitation is required to keep the mixture from hardening before being poured into the trench via a hopper. These new mixtures generally require greater flow control than what is currently available, and slight delays in pouring the mixture can be problematic with the just-in-time product of on-site volumetric concrete mixing, because without temporary storage with continuous agitation, the mixture can harden within the hopper and plug it.

Additionally, small trenches are known to be difficult to backfill with traditional equipment that is designed for wide trenches. The flowable backfill is difficult to properly pour within the narrow trench opening and close working conditions often resulting in voids within the pour. This can also result in the flowable backfill overflowing the trench which increases time and labor costs during the backfill operation for clean-up.

Volumetric Concrete Mixing System and Equipment

This disclosure describes mobile volumetric concrete mixing systems and methods of mixing cement-based mixes. The volumetric concrete mixing system includes a suction system that vacuums up trench spoils while a trench is being cut. These trench spoils may then be screened for particle size to be reused and mixed with water and cement within the volumetric concrete mixing system to form a backfill mixture. This backfill mixture may then be loaded into a hopper that continuously agitates the mixture while the trench is being backfilled so that the mixture does not harden before pouring. From the hopper, the backfill mixture may be channeled to an applicator that facilitates pouring the mixture into the trench.

In one aspect, the technology relates to a mobile volumetric mixing system including: a water-storage chamber; a cement-storage chamber; an aggregate-storage chamber; a suction system configured to draw aggregate into the aggregate-storage chamber from an external source; a conveyor disposed below the aggregate-storage chamber, wherein the conveyor is configured to transport the aggregate to an auger mixer for mixing with water and cement; and a vibrating aggregate screen disposed between the aggregate-storage chamber and the conveyor.

In an example, the mobile volumetric mixing system further includes a large particle-storage chamber configured to collect large particles screened by the vibrating aggregate screen from the aggregate. In another example, the suction system includes a vacuum device and a filtration system. In yet another example, the mobile volumetric mixing system further includes a hose, wherein the suction system is coupled to the hose that extends between the aggregate-storage chamber and a trenching machine. In still another example, the aggregate-storage chamber includes a lift configured to tilt the aggregate-storage chamber about one or more pivots to channel the aggregate towards the vibrating aggregate screen. In an example, the mobile volumetric mixing system is disposed on a vehicle.

In another aspect, the technology relates to a method of mixing a cement-based mixture including: drawing aggregate into an aggregate-storage chamber from an external source by a suction system; channeling the aggregate from the aggregate-storage chamber to a conveyor disposed below the aggregate-storage chamber; screening the aggregate through a vibrating aggregate screen positioned between the aggregate-storage chamber and the conveyor; transporting the aggregate along the conveyor to an auger mixer; and mixing the aggregate with water from a water-storage chamber and cement from a cement-storage chamber to form a flowable fill mixture.

In an example, the method further includes collecting large particles screened by the vibrating aggregate screen from the aggregate channeled from the aggregate-storage chamber in a large particle-storage chamber. In another example, channeling the aggregate from the aggregate-storage chamber to the conveyor includes tilting the aggregate-storage chamber about one or more pivots above the vibrating aggregate screen. In yet another example, drawing the aggregate into the aggregate-storage chamber includes collecting trench spoils ejected from a trenching machine by a vacuum device of the suction system that is coupled to a hose extending between the trenching machine and the aggregate-storage chamber. In still another example, the method further includes loading the flowable fill mixture into a hopper configured to agitate the flowable fill mixture. In an example, the method further includes channeling the flowable fill mixture from the hopper to an applicator.

In another aspect, the technology relates to a hopper for a cement-based mixture including: a chute extending along a longitudinal axis, the chute including an inlet end and an opposite outlet end, wherein the inlet end is positioned above the outlet end such that the chute is oriented substantially vertically; a rotatable shaft disposed within the chute along the longitudinal axis; an auger coupled to the rotatable shaft; and at least one paddle coupled to the rotatable shaft.

In an example, the chute is substantially conically-shaped with a cross-sectional area of the inlet end larger than a cross-sectional area of the outlet end. In another example, the auger is a continuous flight auger disposed adjacent to the outlet end and the at least one paddle is disposed adjacent to the inlet end. In yet another example, the outlet end includes a ball-valve for controlling discharge of the cement-based mixture from the chute. In still another example, the outlet end is offset from the longitudinal axis. In an example, the rotatable shaft is removable from inside of the chute. In another example, the chute includes a hinged access door positioned on a sidewall of the chute.

In another aspect, the technology relates to a hopper for a cement-based mixture including: an inlet chute extending along a longitudinal axis; an auger chute coupled in flow communication with the inlet chute; a rotatable shaft disposed within the auger chute along a rotation axis, wherein the rotation axis is different than the longitudinal axis; and an auger coupled to the rotatable shaft.

In an example, the auger chute includes an outlet end having a cut-off valve for controlling discharge of the cement-based mixture from the auger chute. In another example, the outlet end is offset from the inlet chute. In yet another example, the auger chute is a first auger chute and the first auger chute includes an outlet end, the outlet end is coupled to a second auger chute including a rotatable shaft and an auger. In still another example, the hopper further includes a bracket configured to couple the inlet chute to a discharge chute of an auger mixer. In an example, the bracket is configured to rotate the inlet chute about the longitudinal axis.

In another aspect, the technology relates to an applicator for a cement-based mixture including: a hopper including an inlet end and an outlet end; a hose connector disposed at the inlet end, the hose connector shaped and sized to receive a discharge hose configured to channel a flow of the cement-based mixture into the hopper for discharge out of the outlet end; and a cut-off device disposed at the hose connector and configured to control the flow of the cement-based mixture into the hopper.

In an example, the cut-off device includes a plate that is sized and shaped to cover the hose connector, and wherein when the cut-off device is in a closed position the plate covers the hose connector. In another example, the plate rotates into the closed position. In yet another example, the hopper is mounted on one or more wheels. In still another example, the applicator further includes a guide pin disposed proximate the outlet end.

These and various other features as well as advantages which characterize the volumetric concrete mixing systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Before the volumetric concrete mixing systems, equipment, and methods that are the subject of this disclosure are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise.

This disclosure describes mobile volumetric concrete mixing systems, equipment, and methods of mixing cement-based mixes. The volumetric concrete mixing system includes a suction system that vacuums up trench spoils while a nano or micro trench is being cut. These trench spoils may then be screened for particle size to be reused and mixed with water and cement within the volumetric concrete mixing system. As such, the system can mix backfill quantities as needed and on-site. By reclaiming and reusing the trench spoils on-site as aggregate for the backfill mixture, the trenching and backfilling processes increase in efficiency and reduce cost and construction time. Additionally, the backfill mixture may then be loaded into a hopper that continuously agitates the mixture while the trench is being backfilled. From the hopper, the backfill mixture may be channeled to an applicator that moves along the trench and that enables the mixture to be quickly poured into the trench with little clean-up required. The hopper and the applicator facilitate the controlled placement of the mixture into narrow trenches without hardening of the mixture. Furthermore, the systems described herein facilitate on-site dust control, so as to reduce dust particulate matter that is released into the air while on-site.

Figure 1:
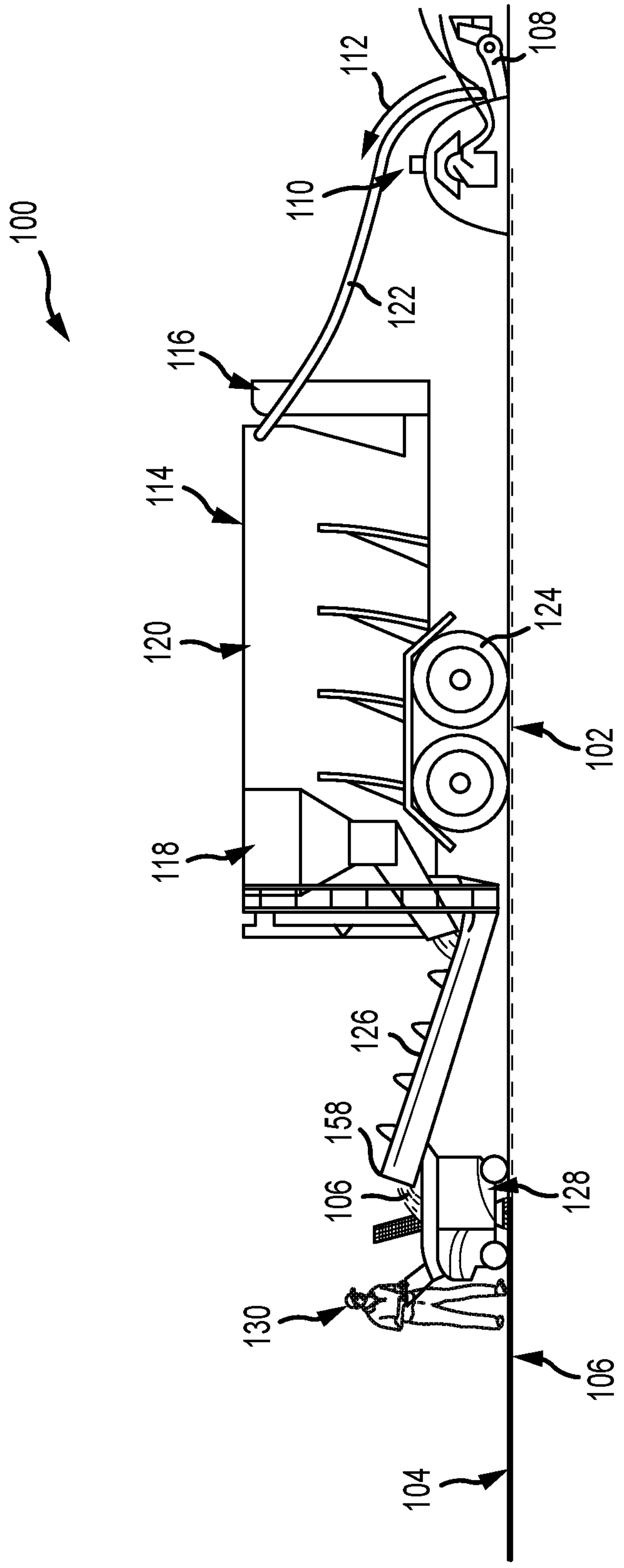
FIG. 1 is a schematic view of an exemplary trench system.

Although the designs and technology introduced above and discussed in detail below may be implement on a variety of mobile platforms (e.g., vehicle, trailer, skid, railcar, marine vessel, etc.), the present disclosure will discuss the implementation of this technology in the form of a volumetric concrete mixing truck in which the volumetric concrete mixing system is mounted on a typical truck chassis, as illustrated in FIG. 1. It is appreciated that the technology described in the context of a volumetric concrete mixing truck could be adapted for use with any other mobile platform including a trailer, a skid, and a railcar to name but a few.

For the purposes of this disclosure aggregate material shall refer to solid material in which greater than 90% by weight of the material is larger than, and will not pass through, a 200 standard mesh. Aggregate materials are normally transported using a belt or chain conveyor or other mechanism.

FIG. 1 is a schematic view of an exemplary trench system 100. In the example, the trench system 100 enables a trench 102 to be cut within a surface structure 104. The surface structure 104 typically includes one or more layers of a pavement structure above a native soil subgrade. For example, the surface structure 104 may be a concrete and/or asphalt based roadway and/or walkway. Once the trench 102 is formed, one or more cables or conduit (not shown) may be installed therein, for example, communication fiber optic cables and the like. The trench 102 may then be backfilled with a flowable fill mixture 106 so as to cover the fiber optic cables and to facilitate repairing the surface pavement structure 104. In the example, the trench 102 may be a nano trench that is approximately ½ inch wide and 3-4 inches in depth, or a micro trench that is approximately 2 inches in width and 12-16 inches in depth. Due to the small sizes of the trench 102, pouring the flowable fill mixture 106 into the trench 102 is a more detailed and time consuming process than backfilling wider trenches. In alternative examples, the trench 102 may have any other size as required or desired.

A trenching machine 108 (e.g., a trencher) may be used to excavate the trench 102 within the surface structure 104. For example, the trenching machine 108 has a saw wheel 110 that cuts (e.g., via a dry cutting method or a wet cutting method) into the surface structure 104 so as to form the trench 102. In some known methods, trench spoils 112 excavated from the trench 102 are removed and disposed of. As used herein, the trench spoils 112 may include, but are not limited to, a mixture of ground up asphalt, ground concrete, an aggregate mineral subbase, and/or subgrade (e.g. native soils). In other known methods, the trench spoils 112 may be removed and recycled off-site. However, in this example, the trench spoils 112 are reused on-site within a volumetric mixing system 114. By directly reusing some or all of the trench spoils 112 on-site, the installation of the fiber optic cables becomes more efficient, thereby decreasing the installation time and increasing the amount of cable length that may be installed during a working shift.

The volumetric mixing system 114 includes a water-storage chamber 116, a cement-storage chamber 118, and an aggregate-storage chamber 120 that facilitate mixing the flowable fill mixture 106 used to backfill the trench 102. The aggregate-storage chamber 120 is sized and shaped to receive the trench spoils 112 that are removed from the trench 102 so that the trench spoils 112 may be reused on-site in the flowable fill mixture 106 without needing to transport the trench spoils 112 off-site for screening. For example, the aggregate-storage chamber 120 is coupled in flow communication to the trenching machine 108 by a flexible hose 122 that extends therebetween so that the trench spoils 112 may be removed from the trench 102 and disposed in the aggregate-storage chamber 120. In the example, the volumetric mixing system 114 may be mounting upon a vehicle 124 so that it is mobile and can follow the trenching machine 108 while cutting the trench 102. In other examples, the volumetric mixing system 114 may be mounted on a trailer or other moveable structure as described above.

In the example, the vehicle 124 may be a typical heavy-duty, straight chassis commercial truck as illustrated. The chassis configuration may have a single-wheeled, front steering axle and two, dual-wheeled driving axles. In an alternative example, two drop-down single wheeled, booster axles maybe provided to maintain legal axle weights when the ingredient storage chambers are fully loaded. A smaller example could be mounted on a pickup truck chassis while a larger version could be mounted on a larger truck, or a semi-trailer for use with an independent tractor.

Once the fiber optic cables are installed within the trench 102, the trench 102 may be backfilled. The volumetric mixing system 114 includes an auger mixer 126 that enables the flowable fill mixture 106 to be mixed and channeled to an applicator 128 that facilitates filling the trench 102. In the example, the auger mixer 126 may include a single auger system, a double auger system, a paddle mixing system, or a combination thereof disposed therein for material mixing. The rotation of the auger both mixes the material delivered into auger mixer 126 and also transports the mixed material to a discharge chute 158 at the end of the auger mixer 126. For example, the auger may be divided into sections to enhance the mixing of the aggregate, water, and cement. The volumetric mixing system 114 is described further below in reference to FIGS. 2 and 3. The applicator 128 receives the flowable fill mixture 106 and enables an operator 130 to control the backfill of the trench 102 so that the mixture is restricted from overflowing the trench 102, thereby reducing clean-up time and costs.

In one operation example, the reclaiming and reuse of the trench spoils 112 may be a two-step process, with the fiber optic cable installation occurring between. The volumetric mixing system 114 first follows the external trenching machine 108 while the trench 102 is being cut. The trench spoils 112 are collected and channeled to the aggregate-storage chamber 120 so that nuisance dust emission and/or accumulation of trench spoils 112 on the surface structure 104 are reduced or eliminated. Cutting the trench 102 would stop when the aggregate-storage chamber 120 is filled. Once the fiber optic cables are installed, then the volumetric mixing system 114 is repositioned proximate to the trench 102 and mixes the flowable fill mixture 106 as needed. The flowable fill mixture 106 is then channeled to the applicator 128 that moves along the trench 102, so that the trench 102 may be backfilled.

In the example, the applicator 128 may be a separate device and receive a load of flowable fill mixture 106 to place into the trench 102 as the volumetric mixing system 114 moves ahead. For example, the applicator 128 may be a self-propelled cart in which the operator 130 directs over and along the trench 102 for backfilling. In other examples, the applicator 128 may follow the volumetric mixing system 114 continuously (e.g., towed from the vehicle 124 or manually pushed by the operator 130) as generally described further below in reference to FIGS. 17-27. In still other examples, the applicator 128 may include an agitation device to keep the flowable fill mixture 106 active until poured into the trench 102. The applicator 128 may also be utilized to pour a sealant over the flowable fill mixture within the trench during a second pass over the trench 102. In alternative examples, the volumetric mixing system 114 may include a device for installing the fiber optic cables within the trench 102, such that cutting the trench, installing the fiber optic cables, and backfilling the trench may all occur in a single pass.

Figure 2:
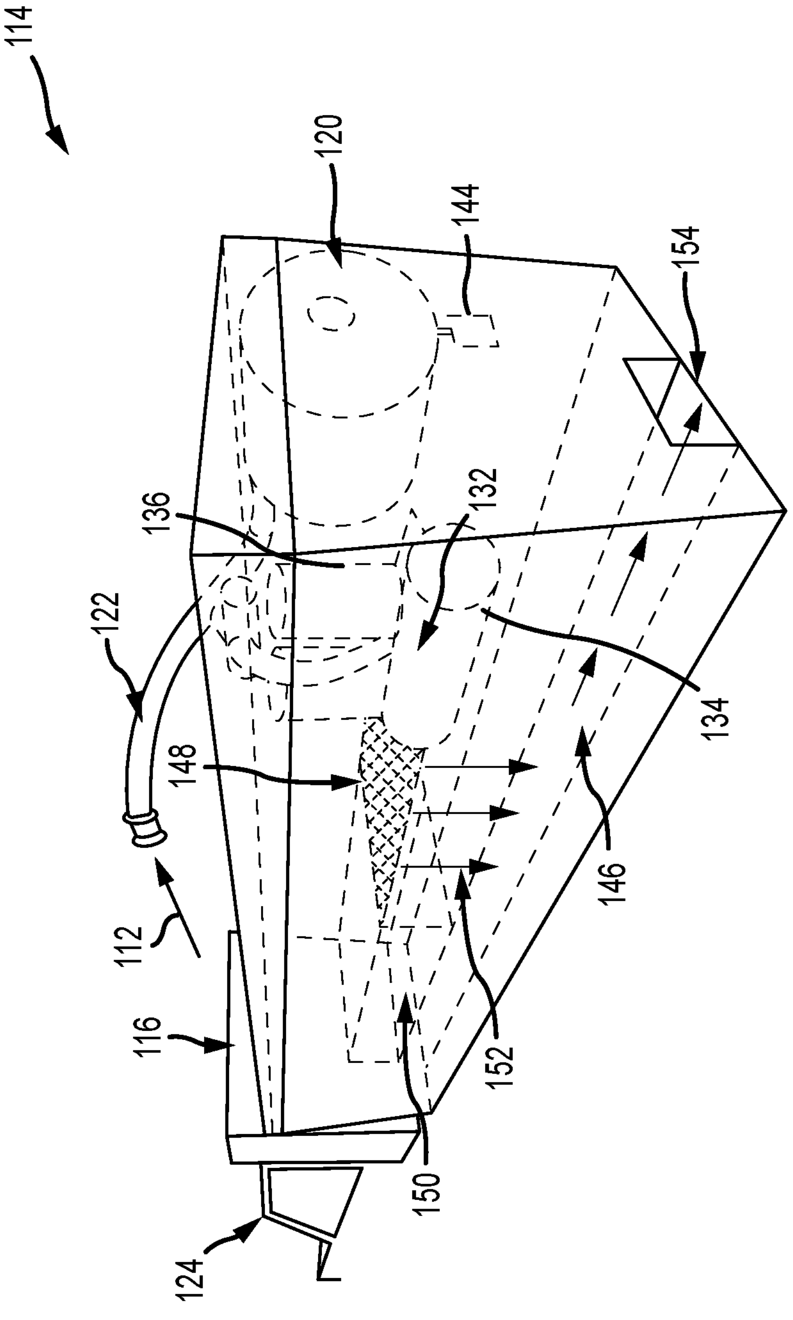
FIG. 2 is a partial perspective view of a volumetric mixing system that may be used with the trench system shown in FIG. 1.
Figure 3:
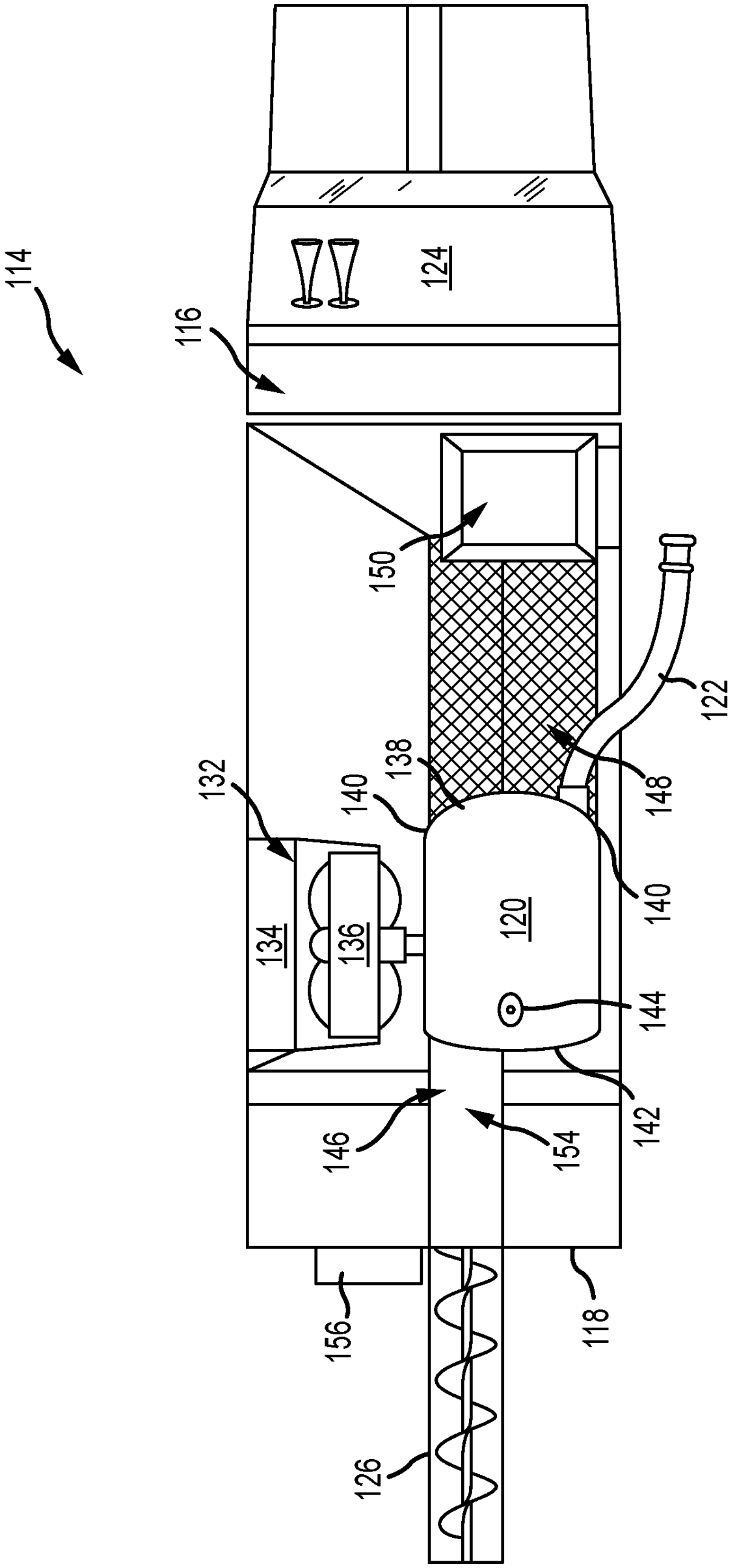
FIG. 3 is a top view of the volumetric mixing system shown in FIG. 2.

FIG. 2 is a partial perspective view of the volumetric mixing system 114 that may be used with the trench system 100 (shown in FIG. 1). The cement-storage chamber 118 is not illustrated in FIG. 2 for clarity. FIG. 3 is a top view of the volumetric mixing system 114. Referring concurrently to FIGS. 2 and 3, the volumetric mixing system 114 is configured to be mounted on the vehicle 124. Supported on the vehicle 124 is the water-storage chamber 116 that holds water utilized in the flowable fill mixing process described herein. In one example, the water-storage chamber 116 may be a polypropylene tank positioned towards the front of the vehicle 124 and adjacent to the cab. A pump (not shown) may be provided to control the flow and pressure of the water delivery. The pump may be electric, hydraulic, or mechanical as required or desired. For example, an engine-driven, power take off water pump may be used to supply water to the auger mixer 126. Alternatively, an electrical water pump could be used to avoid variations in the pump's flowrate due to the vehicle engine's idle speed variations.

Various manual and automatic valves may further be provided to control the flow of water to individual components of the volumetric mixing system 114 as needed. For example, during cleaning and/or flush out operations. One or more water intakes may be provided to allow the water-storage chamber 116 to be filled from any convenient source such as a fire hydrant. Furthermore, the pump may be configurable to allow it to be used to fill the water-storage chamber 116 from an external standing water source such as a tank or a pond.

Also supported on the vehicle 124 is the cement-storage chamber 118 that holds cement utilized in the flowable fill mixing process. In one example, the cement-storage chamber 118 is an air-tight tank positioned towards the rear of the vehicle 124 that holds Portland cement. The cement can be channeled to the auger mixer 126 by one or more feed screw conveyors (sometimes also referred to an auger conveyor) positioned below the cement-storage chamber 118. However, any other cement binder may also be used.

In the example, the flowable fill mixture includes at least water, cement, and aggregate components. It is appreciated that the flowable fill mixture may have any number of components in order to mix the concrete with properties that are required or desired. Mixture components may include, but are not limited to, sand, gravel, stone, slag, fly ash, silica fume, polymers, chemical admixtures, etc. As such, any number of these components may be stored in storage chambers positioned within the system 114 so as to facilitate forming the mixture.

Positioned between the water-storage chamber 116 and the cement-storage chamber 118 is the aggregate-storage chamber 120. In the example, the aggregate-storage chamber 120 is an enclosed tank that is coupled to the hose 122 so that the trench spoils 112 may be received therein and without dust particles being expelled into the surrounding air. A suction system 132 is coupled to the hose 122 so as to draw the trench spoils 112 into the aggregate-storage chamber 120 from the trenching machine 108 (shown in FIG. 1). The suction system 132 may include a vacuum device 134, such as a blower and/or high-powered vacuum pump, and a filtration system 136, such as one or more baghouses with filtration to control dust. The suction system 132 is configured to generate a vacuum suction through the hose 122 and capture the trench spoils 112 as they are ejected from the trench 102 (shown in FIG. 1) by the trenching machine. By using the suction system 132, nuisance dust emissions and accumulation of trench spoils 112 on the surface structure are reduced or eliminated, thereby increasing the efficiency of the trenching process without negatively impacting the surrounding air quality. In alternative examples, the aggregate-storage chamber 120 may be an open air bin such that the trench spoils 112 may be accumulated and separately loaded into the bin, for example, by an off-site loader.

The suction system 132 may also be provided with a manual or automated system for clearing the filters during operation. In such an example, valving and connecting air lines may be provided to allow filtered air to be backflushed through the filter media in order to clear the filter media of surface dust that may be fouling the media. Backflushing may include using a valve to block flow out of one or more filters and initiating a counter flow of pressurized air through the filter media into the baghouse. Backflushing may be done based on elapsed time or in response to loss in performance such as a detected reduction in air flow through the baghouse or increased pressure drop across the filter media. The backflushing operation may be done manually or may be controlled by the controller 156 (described below) and may occur without interrupting the suction operation.

The aggregate-storage chamber 120 may include a front end 138 supported on one or more pivots 140 and a rear end 142 supported on a lift 144. For example, the lift 144 is a hydraulic ram that enables the rear end 142 to be lifted for tilting the aggregate-storage chamber 120 about the pivots 140. As such, the trench spoils 112 that are received within the aggregate-storage chamber 120, can be emptied from the front end 138 and utilized in the flowable fill mixing process. The aggregate-storage chamber 120 may also include a weight and/or volume sensor(s) (not shown) so as to indicate the amount of trench spoils 112 held therein.

The volumetric mixing system 114 also includes a conveyor 146 disposed below the aggregate-storage chamber 120, an aggregate screen 148 positioned between the aggregate-storage chamber 120 and the conveyor 146, and a large particle-storage chamber 150. In operation, the aggregate-storage chamber 120 is selectively emptied onto the aggregate screen 148. The aggregate screen 148 may be a vibrating screen and is used to screen the trench spoils 112 before being used as aggregate 152 in the flowable fill mixing process. This provides protection to ensure that no individual aggregate particles are too large for the trench width that is being backfilled and to ensure the quality of the flowable fill mixture. These large aggregate particles are collected within the large particle-storage chamber 150 for disposal at a later time off-site. The aggregate screen 148 may include any size mesh as require or desired, and in other examples, may also include a series of mesh sizes.

By screening the trench spoils 112 through the aggregate screen 148, only the desirable portions of the trench spoils are reused so that a quality concrete mixture is formed for the backfill. It is also possible to reuse all of the trench spoils 112 when forming the new backfill mixture. In some examples, the large particle-storage chamber 150 may be a closed bin with a chute extending out of the volumetric mixing system 114 for automatically disposing the large aggregate particles at an off-site location. Additionally, the aggregate-storage chamber 120 may be configured to dispose trench spoils 112 off-site, because some of the trench spoils 112 may not be used during the backfilling process due to the additional volumes of cement, water, and/or fly ash in the backfill mixture, as well as the volume of the installed fiber optic cable.

The trench spoils 112 channeled through the aggregate screen 148 drop onto the conveyor 146 located below and form the aggregate 152 utilized in the flowable fill mixture. By reclaiming and reusing the trench soils 112 from the trench cutting process, the backfilling process is more efficient in both cost and time. The conveyor 146 extends longitudinally along the bottom of the volumetric mixing system 114 and includes a conveyor belt that is configured to selectively transport the aggregate 152 towards a discharge opening 154 located at the rear of the volumetric mixing system 114. At the discharge opening 154, the aggregate 152 is dropped into the auger mixer 126 for mixing with water, cement, and any other admixture to form the flowable fill mixture 106 as needed for use in the trench backfill. In some examples, the aggregate screen 148 may be bypassed entirely such that the trench spoils 112 are channeled directly from the aggregate-storage chamber 120 to the conveyor 146 for use in the flowable fill mixture.

By separately storing aggregate, cement, and water in the volumetric mixing system 114, the flowable fill mixture 106 can be mixed together in the auger mixer 126 on-site. Generally, the aggregate and cement are measured in a volumetric manner to regulate the mixed design and may be calculated by the size of the respective gate opening and/or the speed of the conveyor. As such, the volumetric mixing system 114 may include a controller 156, located at the end of the unit near the auger mixer 126, and that is operably coupled to one or more components therein so as to control the delivery of the various mix ingredients. The location enables the operator to observe the discharge of the mixed product while controlling the volumetric mixing system 114 operation.

In an example, the controller is a general purpose computing device having a user interface and a display, running purpose-written software for receiving the monitored parameters, storing preset operational parameter settings which may include mix formulations, making mix calculations based on the monitored parameters, comparing the monitored parameters and/or calculated mix formulations to preset settings, and displaying information to the operator. In an automated embodiment, the controller 156 may also be programmed to control the valves, pumps, vacuums, hydraulic cylinders, hoppers, applicators, and other components of the volumetric mixing system 114. The controller 156 may further be provided with a printer for printing receipts and delivery tickets documenting the product delivered during a mix operation.

Gauges and meters are provided on the controller 156 to monitor water flow (e.g., in gallons per minute or GPM), conveyor speed (e.g., in feet per minute or FPM), auger speed (e.g., in revolutions per minute or RPM), air pressure (e.g., in pounds per square inch or PSI), and air flow (e.g., in cubic feet per minute or CFM) functions. Tachometers on the material conveyance augers provide RPM measurements that allow faster, correct mixture proportions at startup, and minor adjustments to the mix production. In an example, the volumetric mixing system 114 may be controlled with a fixed touch-screen control display and/or flexible cable-connected handset with any of the following controls: ON/OFF switches that control the feed screw conveyors and main-system ingredient delivery (water, cement, and aggregate); a vehicle engine motor speed control switch (changing from idle to full operation RPM), or other controls as required or desired. Momentary toggle switches may control the auger mixer 126 and the hopper, which is described further below.

In an alternative example, in addition to or instead of the handset or fixed touch-screen control display, the controller 156 enables for wireless control via an application on a portable, wireless device. Wireless communications may use Bluetooth® or some other communication protocol so that the controller 156 provides a graphical user interface (GUI) to the wireless device (phone, tablet, and laptop) for control of the volumetric mixing system 114.

In some examples, the volumetric mixing system 114 may be formed by removably securing one or more of the aggregate-storage chamber 120, the suction system 132, the aggregate screen 148, and/or the large particle-storage chamber 150 within an aggregate bin of a traditional volumetric concrete mixing truck. As such, these components may then be removed as required or desired. In other examples, the aggregate bins of the traditional volumetric concrete mixing truck may be permanently replaced with one or more of the aggregate-storage chamber 120, the suction system 132, the aggregate screen 148, and/or the large particle-storage chamber 150. This enables larger capacity systems to form the volumetric mixing system 114 because more space is available without the open-air aggregate bins present on the truck.

Figure 4:
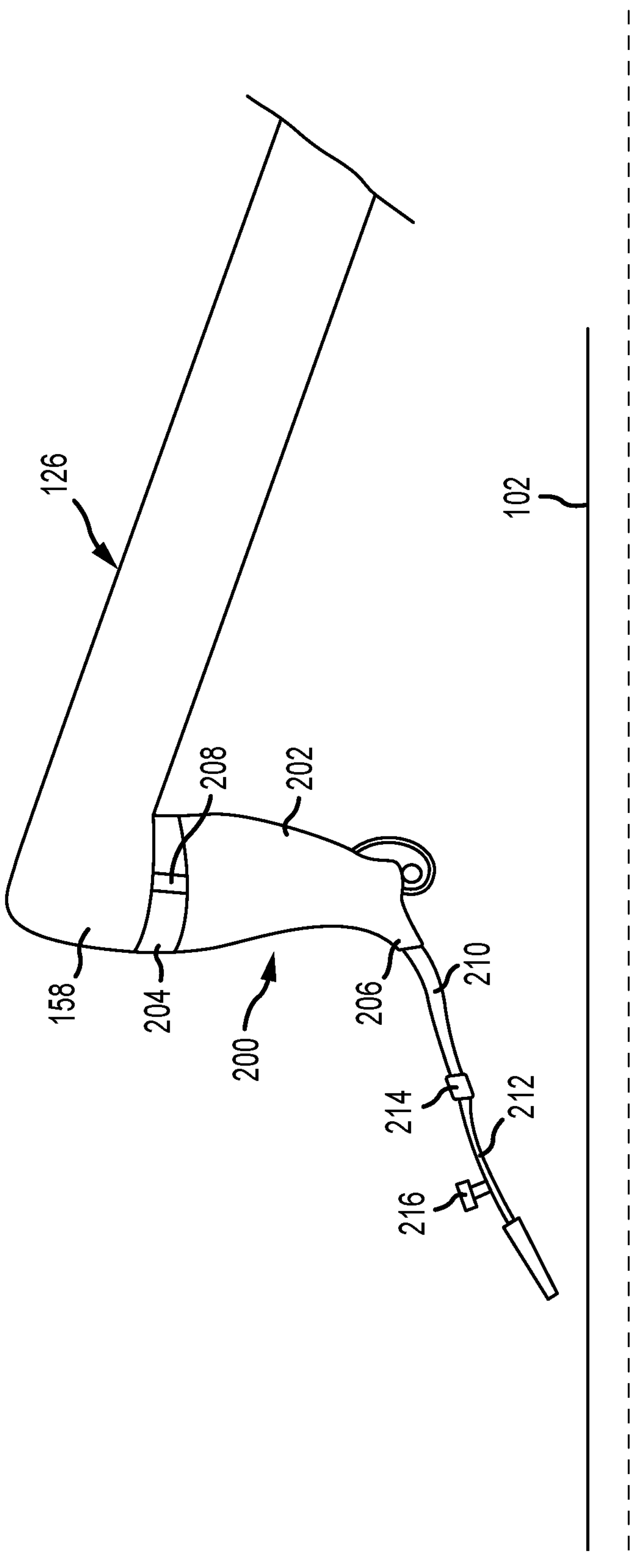
FIG. 4 is a schematic view of a vertical hopper that may be used with the trench system shown in FIG. 1.

FIG. 4 is a schematic view of a vertical hopper 200 that may be used with the trench system 100 (shown in FIG. 1). As described above, the auger mixer 126 receives aggregate, water, cement, and any other admixtures for mixing the flowable fill mixture used in backfilling the trench 102, after one or more fiber optic cables are installed. However, some known flowable fill mixtures are rapid setting, and thus, require continuous agitation to keep the mixture fluid until placement and to reduce hardening. As such, the hopper 200 is mounted at a discharge chute 158 of the auger mixer 126 to reduce mixture hardening before the flowable fill mixture is poured into the trench 102.

The hopper 200 includes a chute 202 having an inlet end 204 positioned above an opposite outlet end 206, such that the chute 202 is oriented substantially vertically in regards to the trench 102. The inlet end 204 is coupled to the discharge chute 158 by a bracket 208 so that the flowable fill mixture from the auger mixer 126 is channeled into the chute 202 after mixing. One or more discharge hoses 210, 212 may be attached to the outlet end 206. For example, a larger 4 inch hose 210 is coupled to the outlet end 206 that is then reduced to a smaller 2 inch hose 212 by a reducer 214. The smaller hose 212 includes a cut-off valve 216 to enable an accurate feed flow and quick flow cut-off from the hose 212 for backfilling the trench 102.

In operation, the hopper 200 continuously agitates the flowable fill mixture so that undesirable hardening of the mixture is reduced before it is poured into the trench 102. Once the fiber optic cables are installed into the trench 102, the hose 212 and cut-off valve 216 are used so as to control flow of the flowable fill mixture into the trench 102 and cover the cables, as needed. The valve and small size of the hose facilitate a controlled and specific pour of the flowable fill mixture within a small trench so as to reduce void formation and overflow pours. In one example, the flowable fill mixture may be backfilled to the full depth of the trench 102. In other examples, the flowable fill mixture may be backfilled to approximately ½-2 inches below grade, thereby allowing for a sealant to be applied on top of the backfilled mixture. Additionally, the hoses 210, 212 may be replaceable if they become plugged with hardened mixture. Further, by mounting the hopper 200 to the auger mixer 126, the hopper 200 also provides an environmentally-acceptable wash out location for the auger mixer 126.

Figure 5:
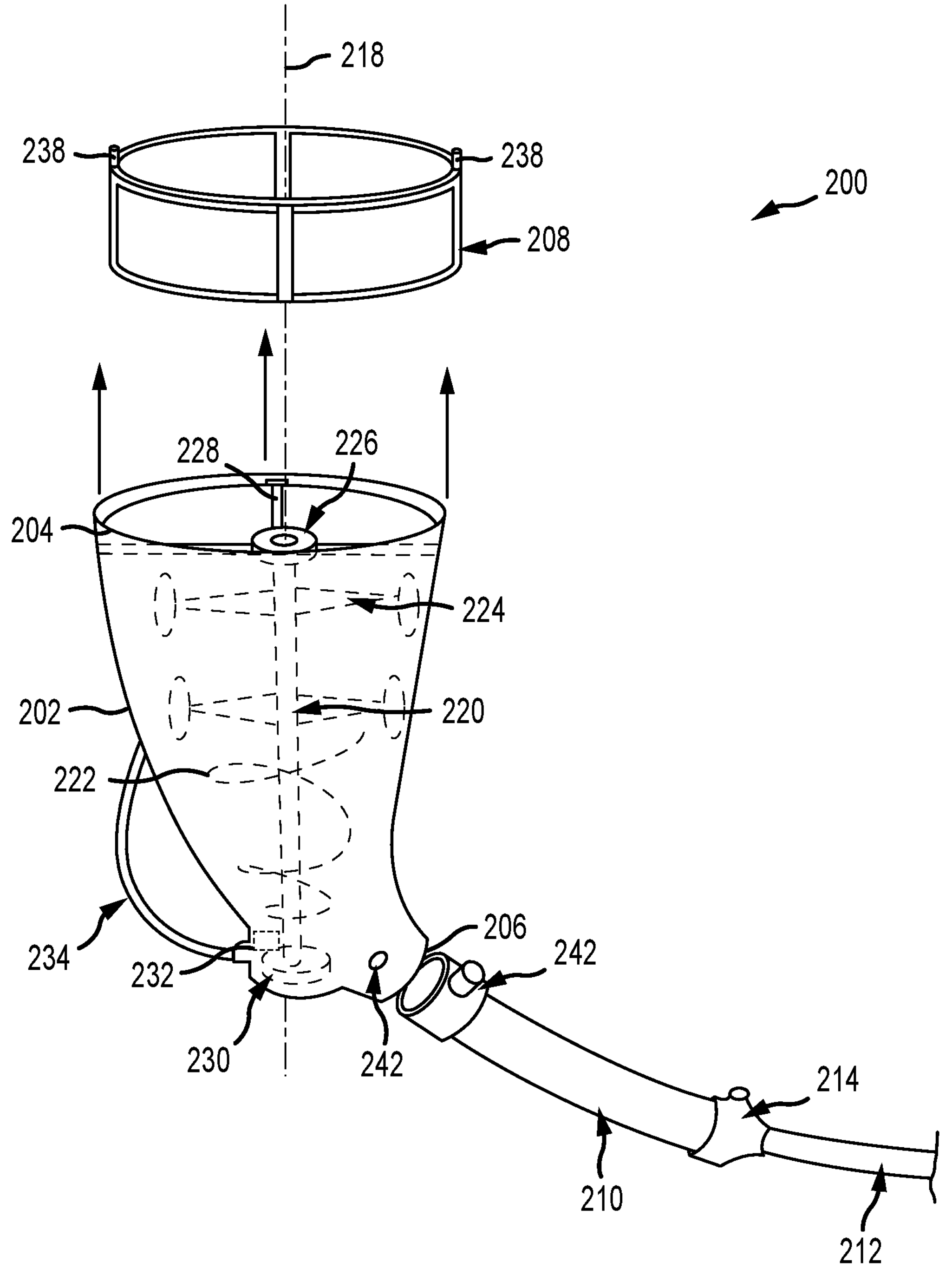
FIG. 5 is a perspective view of the hopper shown in FIG. 4.
Figure 6:
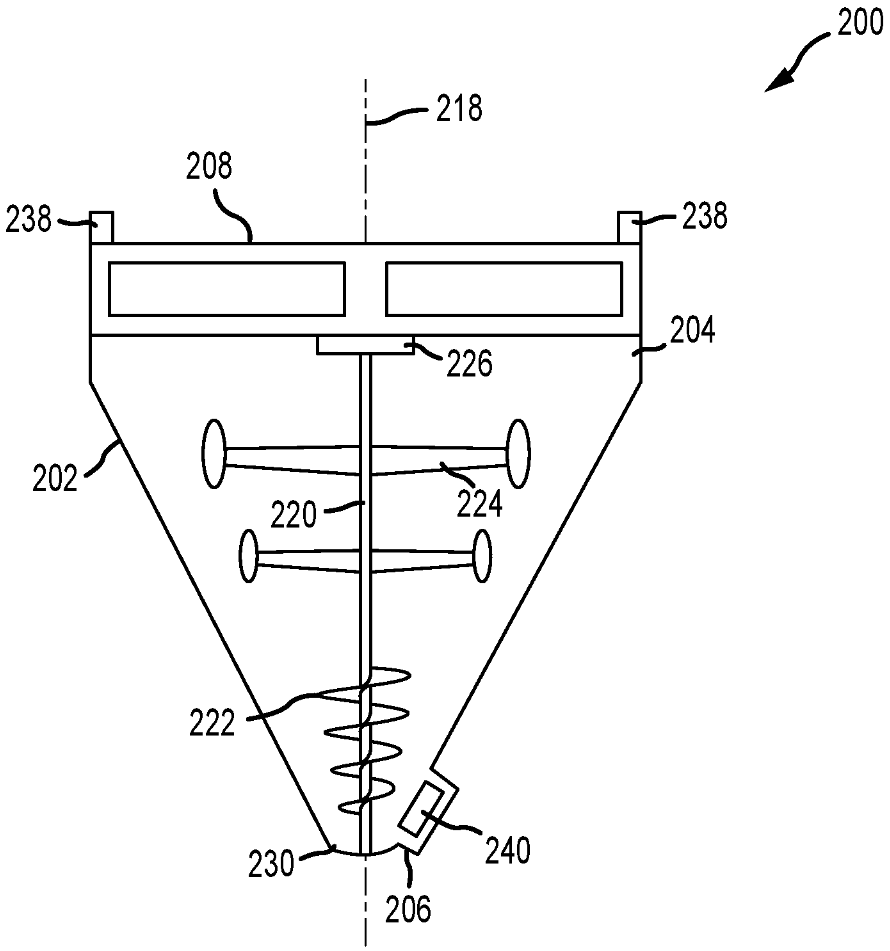
FIG. 6 is a side-sectional view of the hopper shown in FIG. 4.
Figure 7:
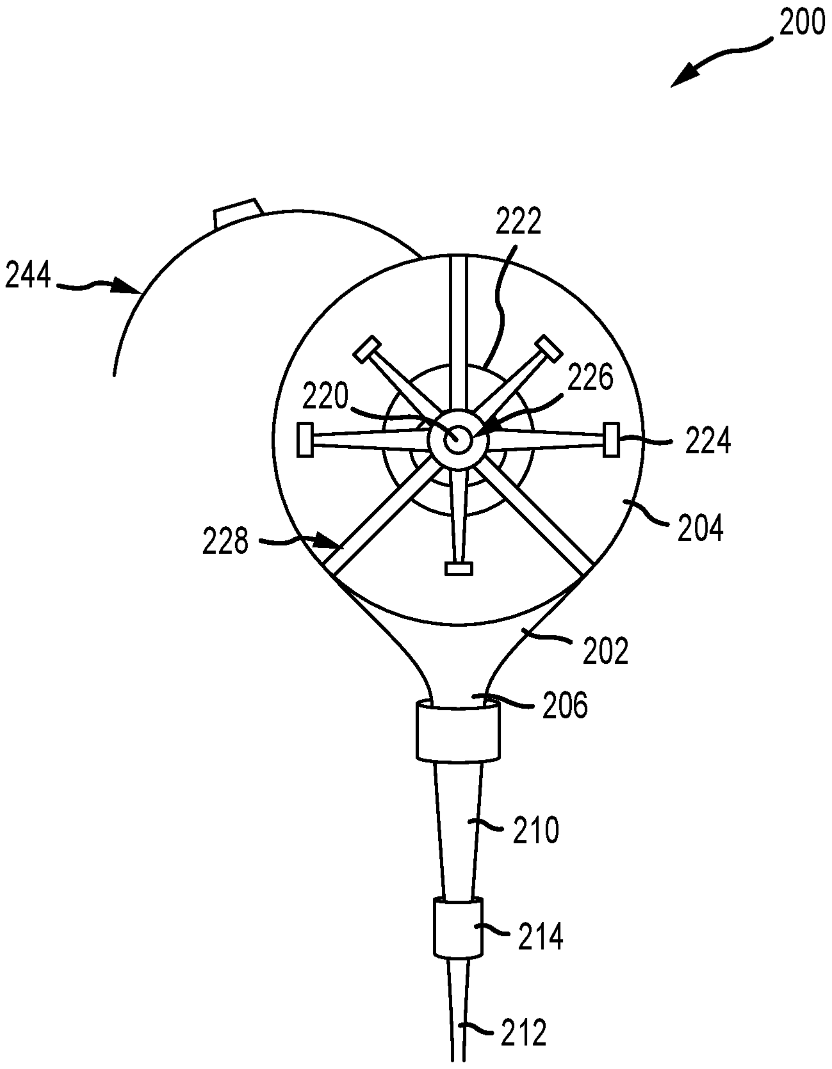
FIG. 7 is a top view of the hopper shown in FIG. 4.

FIG. 5 is a perspective view of the hopper 200. FIG. 6 is a side-sectional view of the hopper 200. FIG. 7 is a top view of the hopper 200. Referring concurrently to FIGS. 5-7, the hopper 200 includes the chute 202 that extends along a longitudinal axis 218 which substantially aligns with the vertical direction when the hopper 200 is mounted to the auger mixer 126 (shown in FIG. 4). In the example, the chute 202 is substantially conical-shaped with a cross-sectional area of the inlet end 204 that is greater than a cross-sectional area of the outlet end 206. A rotatable shaft 220 is disposed within the chute 202 and extends along the longitudinal axis 218. The rotatable shaft 220 supports an auger 222 and at least one mixing paddle 224 to both mix and assist the discharge flow of the flowable fill mixture.

The top end of the rotatable shaft 220 is supported on a roller bearing 226 that is secured in place by one or more arms 228. The lower end of the rotatable shaft 220 is also supported on a roller bearing 230 secured within the chute 202 and adjacent to the outlet end 206. In the examples, the outlet end 206 is offset from the longitudinal axis 218. The bearings 226, 230 restrain the shaft 220 laterally while enabling the shaft 220 to rotate about the longitudinal axis 218. Additionally, the bearings 226, 230 enable the rotatable shaft 220 to be removed from the chute 202 so as to facilitate cleaning and disassembly of the hopper 200. In the example, rotation of the shaft 220 about the longitudinal axis 218 may be driven by a hydraulic motor 232 that is powered by the volumetric mixing system's hydraulic system and may be controlled by the controller and/or hydraulic valves therein. For example, a hydraulic line 234 extends from the hopper 200 and to the volumetric mixing system. The hydraulic motor 232 may drive the shaft 220 by a flexible coupler positioned therebetween, so as to enable the shaft 220 to be removable. In some examples, the hydraulic motor 232 may be positioned at the top of the rotatable shaft 220. In alternative examples, rotation of the shaft 220 may be powered by any other system that enables the hopper 200 to function as described herein.

In the example, the paddles 224 may be coupled to one section of the rotatable shaft 220 and positioned adjacent to the inlet end 204. For example, the paddles 224 include two sections of three-bladed mixing paddles so as to facilitate the continuous mixing of the flowable fill mixture. The auger 222 may be coupled to another section of the rotatable shaft 220 and positioned adjacent to the outlet end 206. For example, the auger 222 may be a tapered continuous-flight auger to assist in discharging the flowable fill mixture out of the outlet end 206. When the shaft 220 rotates, the auger 222 and/or the paddles 224 generate a down force on the flowable fill mixture to facilitate channeling the mixture out of the outlet end 206.

The bracket 208 is sized and shaped to couple the chute 202 to the auger mixer 126 so that the flowable fill mixture can be dropped into the hopper 200 and then poured into the trench. In some examples, the bracket 208 may be open at top so that the flowable fill mixture can be visually inspected as it is dropped into the hopper 200 from the auger mixer 126 and provide a quality control check. To couple the bracket 208 to the auger mixer, two support tabs 238 may extend from the top rim, which enables attachment to two corresponding lateral side pins on the auger mixer 126. In alternative examples, other coupling elements may be utilized. In some examples, the bracket 208 may enable the chute 202 to rotate about the longitudinal axis 218 so as to assist in orienting the discharge hoses 210, 212 towards a desired location.

The outlet end 206 of the chute 202 includes a valve 240, such as a ball-valve, to control the discharge flow of the flowable fill mixture. In an example, the valve 240 may be a camlock, quick-release coupler that is connectable to the rubber discharge hoses 210, 212. The valve 240 may be manually operable or coupled to the controller for operation. In operation, the outlet end 206 area may be prone to clogging because of hardening of the flowable fill mixture. As such, the discharge hoses 210, 212 are quickly replaceable in order to facilitate continued operation. Additionally, the chute 202 and/or the hoses 210, 212 may include a water hose attachment 242 so as to enable the outlet end 206 area to be washed out with water.

In some examples, the chute 202 may include an access door 244 (shown in FIG. 7) positioned on a sidewall of the chute 202 between the inlet end 204 and the outlet end 206. The access door 244 is hinged so as to enable access into the interior of the chute 202 for cleaning. Additionally, the access door 244 enables the rotatable shaft 220, the auger 222, and the paddles 224 to be removed from the hopper 200. This allows the hopper 200 to be field disassembled into individual components that are readily lifted by operators without the need for lifting devices.

Figure 8:
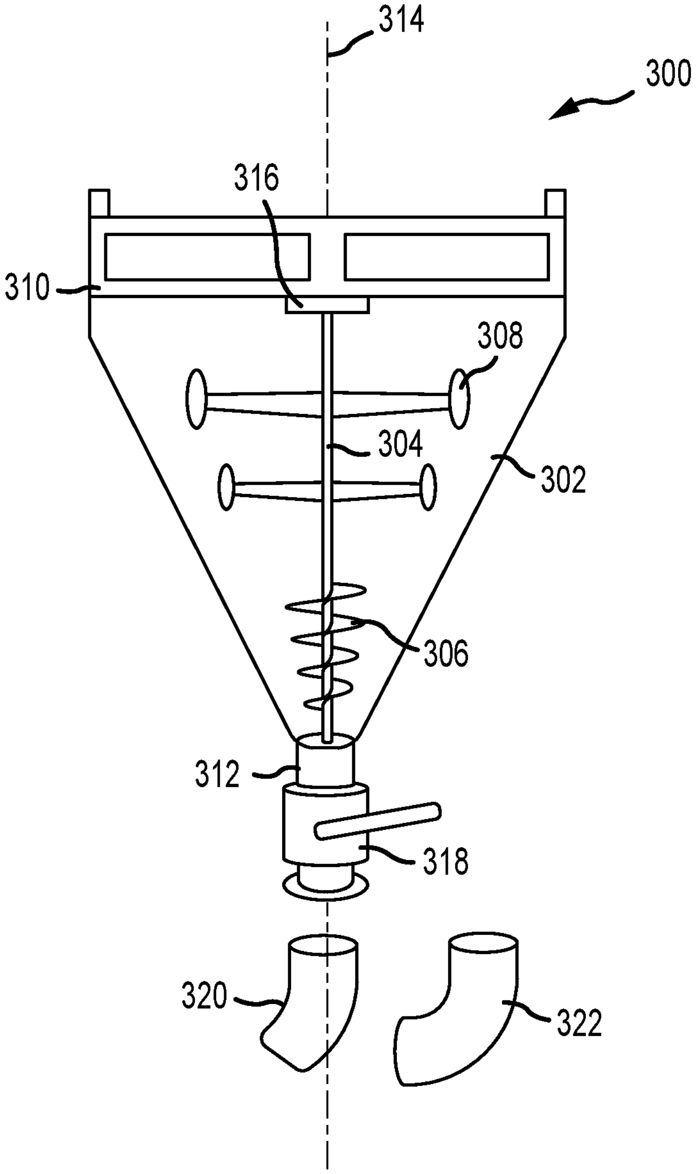
FIG. 8 is a side-sectional view of another vertical hopper that may be used with the trench system shown in FIG. 1.

FIG. 8 is a side-sectional view of another vertical hopper 300 that may be used with the trench system 100 (shown in FIG. 1). Similar to the hopper described above in FIGS. 5-7, this hopper 300 includes a substantially conical-shaped chute 302 having a removable rotatable shaft 304 extending therein. The rotatable shaft 304 has an auger 306 and one or more paddles 308 to both mix and assist the discharge flow of the flowable fill mixture. However, in this example, the chute 302 has an inlet end 310 and an opposite outlet end 312 that are in line with a longitudinal axis 314 of the chute 302. In this example, the rotatable shaft 304 is only supported at the top by a bearing 316. At the bottom of the shaft 304, the auger 306 is sized and shaped to extend at least partially within the outlet end 312 so that lateral movement of the shaft 304 is restricted, while also enabling the flowable flow mixture to be discharged out of the chute 302 via the auger 306.

In the example, the outlet end 312 may be a 3 inch diameter outlet. The outlet end 312 may include a valve 318 to control the discharge flow of the flowable fill mixture from the chute 302. The valve 318 may be configured to be coupled to a discharge hose (not shown) through fittings 320, 322. For example, the fittings 320, 322 may be angled so as to direct the discharge hose towards the trench as required or desired. The fitting 320 may be angled at 45° with regards to the longitudinal axis 314 and the fitting 322 may be angled at 90° with regards to the longitudinal axis 314. In other examples, fittings with any other angles may be utilized.

Figure 9:
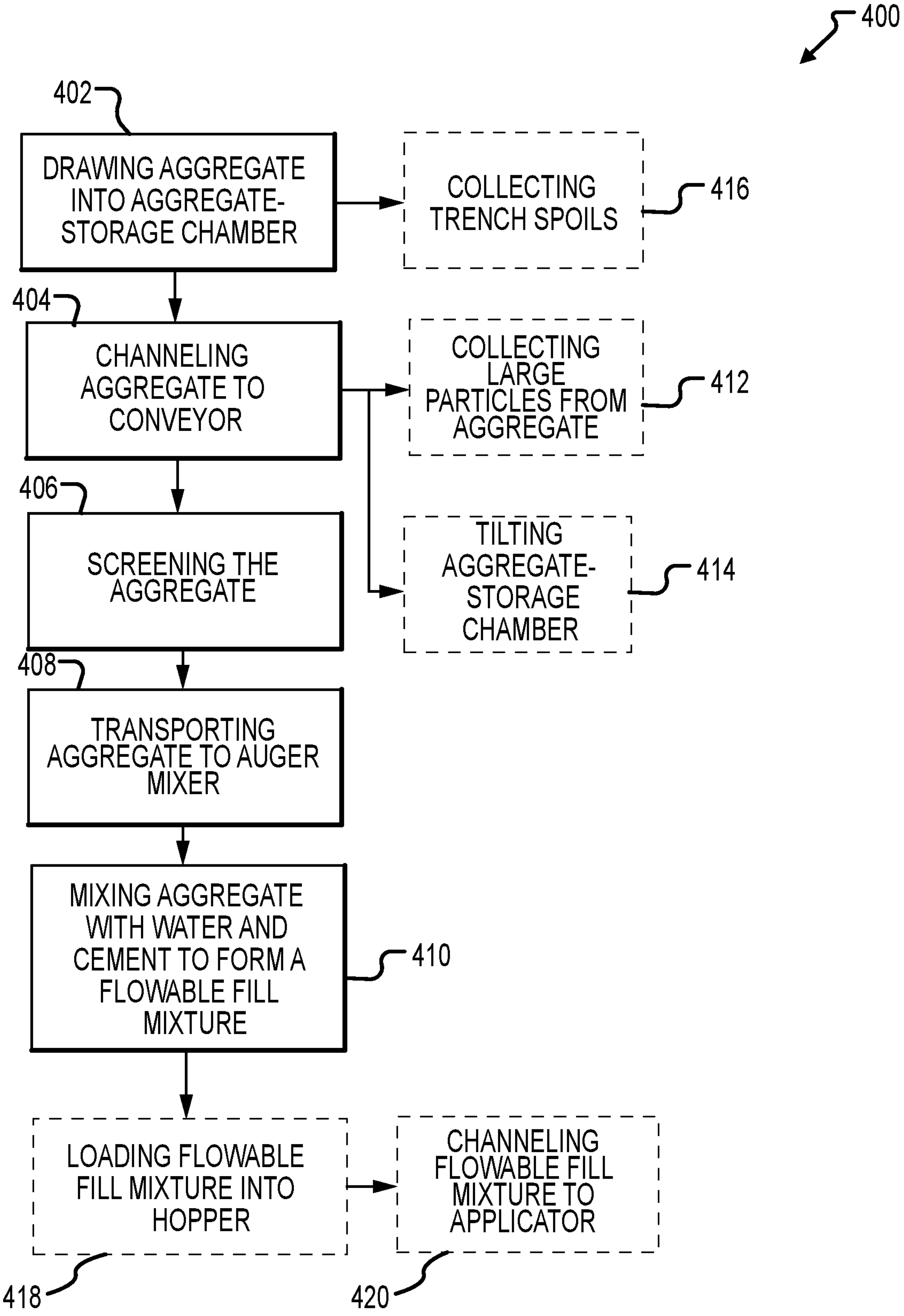
FIG. 9 is a flowchart illustrating an exemplary method of mixing a cement based mixture.

FIG. 9 is a flowchart illustrating an exemplary method 400 of mixing a cement based mixture. In the example, a volumetric mixing system as described above may be used to draw aggregate into an aggregate-storage chamber from a trenching machine by a suction source (operation 402). The aggregate is then channeled from the aggregate-storage chamber to a conveyor that is disposed below the aggregate-storage chamber within the volumetric mixing system (operation 404). As the aggregate is channeled from the aggregate-storage chamber to the conveyor (operation 404), the aggregate is screened through a vibrating aggregate screen positioned between the aggregate-storage chamber and the conveyor (operation 406). The conveyor transports the screened aggregate to an auger mixer (operation 408) and then the aggregate is mixed with water and cement to form a flowable fill mixture for backfilling a trench (operation 410). The water may be from a water-storage chamber within the volumetric mixing system and the cement may be from a cement-storage chamber within the volumetric mixing system. Although in other examples, the flowable fill mixture may have any other mix components as required or desired, such as fly ash.

In an example, when the aggregate is screened through the vibrating aggregate screen (operation 406), the large particles screened by the vibrating aggregate screen may be collected in a large particle-storage chamber positioned within the volumetric mixing system (operation 412). These large particles may be stored and disposed off-site. In another example, the aggregate-storage chamber may be tilted about one or more pivots above the vibrating aggregate screen (operation 414) so as to channel the aggregate from the aggregate-storage chamber to the conveyor (operation 404).

In some examples, when drawing the aggregate into the aggregate-storage chamber (operation 402), the trench spoils that are ejected from a trenching machine are collected by a vacuum device of the suction system that is coupled to a hose and that extends between the trenching machine and the aggregate-storage chamber (operation 416). This decreases dust particles being expelled into the on-site ambient air. In other examples, once the flowable fill mixture is mixed, the flowable fill mixture may be loaded into a hopper that is configured to agitate the flowable fill mixture (operation 418). In still other examples, the flowable fill mixture may be channeled from the hopper to an applicator for pouring into the trench (operation 420).

Figure 10:
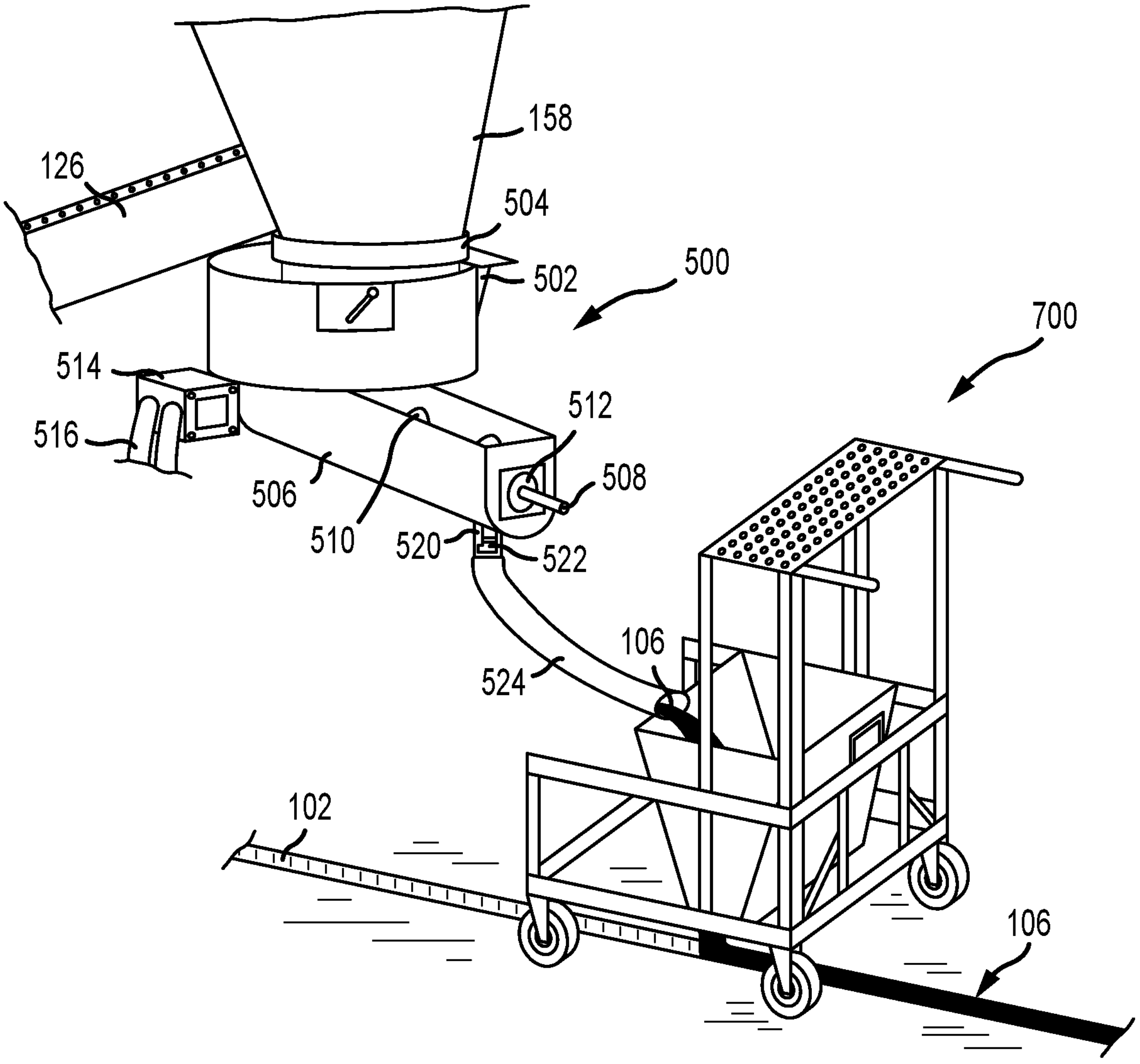
FIG. 10 is a perspective view a horizontal hopper that may be used with the trench system shown in FIG. 1.
Figure 11:
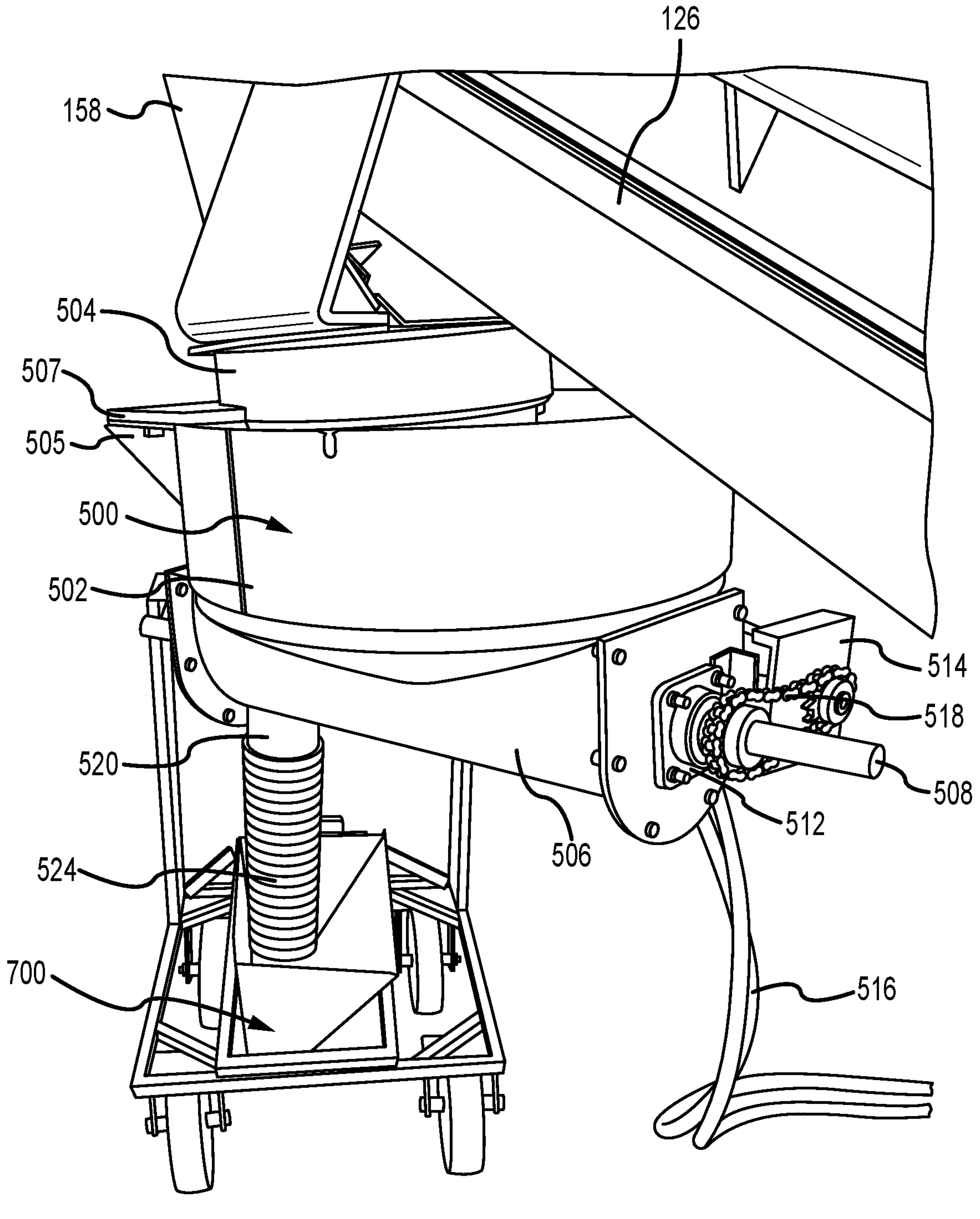
FIG. 11 is another perspective view of the hopper shown in FIG. 10.

FIG. 10 is a perspective view a horizontal hopper 500 that may be used with the trench system 100 (shown in FIG. 1). FIG. 11 is another perspective view of the hopper 500. Referring concurrently to FIGS. 10 and 11, the auger mixer 126 receives aggregate, water, cement, and any other admixtures for mixing the flowable fill mixture 106 used in backfilling the trench 102 (shown in FIG. 10), after one or more fiber optic cables are installed and as described above. However, some known flowable fill mixtures are rapid setting, and thus, require continuous agitation to keep the mixture fluid until placement and reduce hardening. As such, the hopper 500 is mounted at the discharge chute 158 of the auger mixer 126 to reduce mixture hardening before the flowable fill mixture 106 is poured into the trench 102.

The hopper 500 includes an inlet chute 502 removably coupled to the discharge chute 158 by a bracket 504 so that the flowable fill mixture 106 from the auger mixer 126 is channeled into the hopper 500 after mixing. The bracket 504 is sized and shaped to couple to inlet chute 502 to the auger mixer 126 so that the flowable fill mixture 106 can be dropped into the hopper 500 and then poured into the trench. To couple the bracket 504 to the auger mixer 126, one or more support tabs 505 may extend from the top rim, which enables attachment to corresponding attachment flanges 507 on the auger mixer 126 via a bolted connection (shown in FIG. 11). In alternative examples, other coupling elements may be utilized, for example, support tabs located on the top rim that enable attachment to corresponding lateral side pins of the discharge chute. An elongated auger chute 506 is coupled below and in flow communication with the inlet chute 502. A rotatable shaft 508 is mounted within the auger chute 506 and includes a single continuous flight auger 510 coupled thereto. In alternative examples, a paddle system or a double-auger system may additionally or alternatively be disposed within the auger chute 506 as required or desired.

Both ends of the rotatable shaft 508 may be supported on roller bearings 512 so as to restrain the shaft 508 laterally while enabling the shaft 508 to rotate. Additionally, the bearings 512 enable the rotatable shaft 508 to be removed from the auger chute 506 so as to facilitate cleaning and disassembly of the hopper 500. In the example, rotation of the shaft 508 may be driven by a hydraulic motor 514 that is powered by the volumetric mixing system's hydraulic system and may be controlled by the controller and/or hydraulic valves therein. For example, one or more hydraulic lines 516 extend from the hopper 500 and to the volumetric mixing system. The hydraulic motor 514 may drive the shaft 508 by a transmission 518, such as a chain and gears, so as to enable the shaft 508 to be removable. In alternative examples, rotation of the shaft 508 may be powered by any other system that enables the hopper 500 to function as described herein.

Opposite the motor 514, the auger chute 506 includes an outlet end 520 that has a flow control valve 522, such as a ball-valve or a cut-off valve, which enables the discharge mixture flow out of the auger chute 506 to be controllable. In the example, a discharge hose 524 is coupled to the outlet end 520 so that the flowable fill mixture 106 may be channeled from the hopper 500 to an applicator 700 that facilitates pouring the mixture into the trench 102 while reducing mixture overflow. The applicator 700 is described further below in reference to FIG. 17. In an example, the valve 522 may be a camlock, quick-release coupler that is connectable to the rubber discharge hose 524. The valve 522 may be manually operable or coupled to the controller for operation. In operation, the hopper 500 continuously agitates the flowable fill mixture 106 so that undesirable hardening of the mixture is reduced before it is poured into the trench 102. This enables more rapid-setting mixtures to be used during the backfill process.

Figure 12:
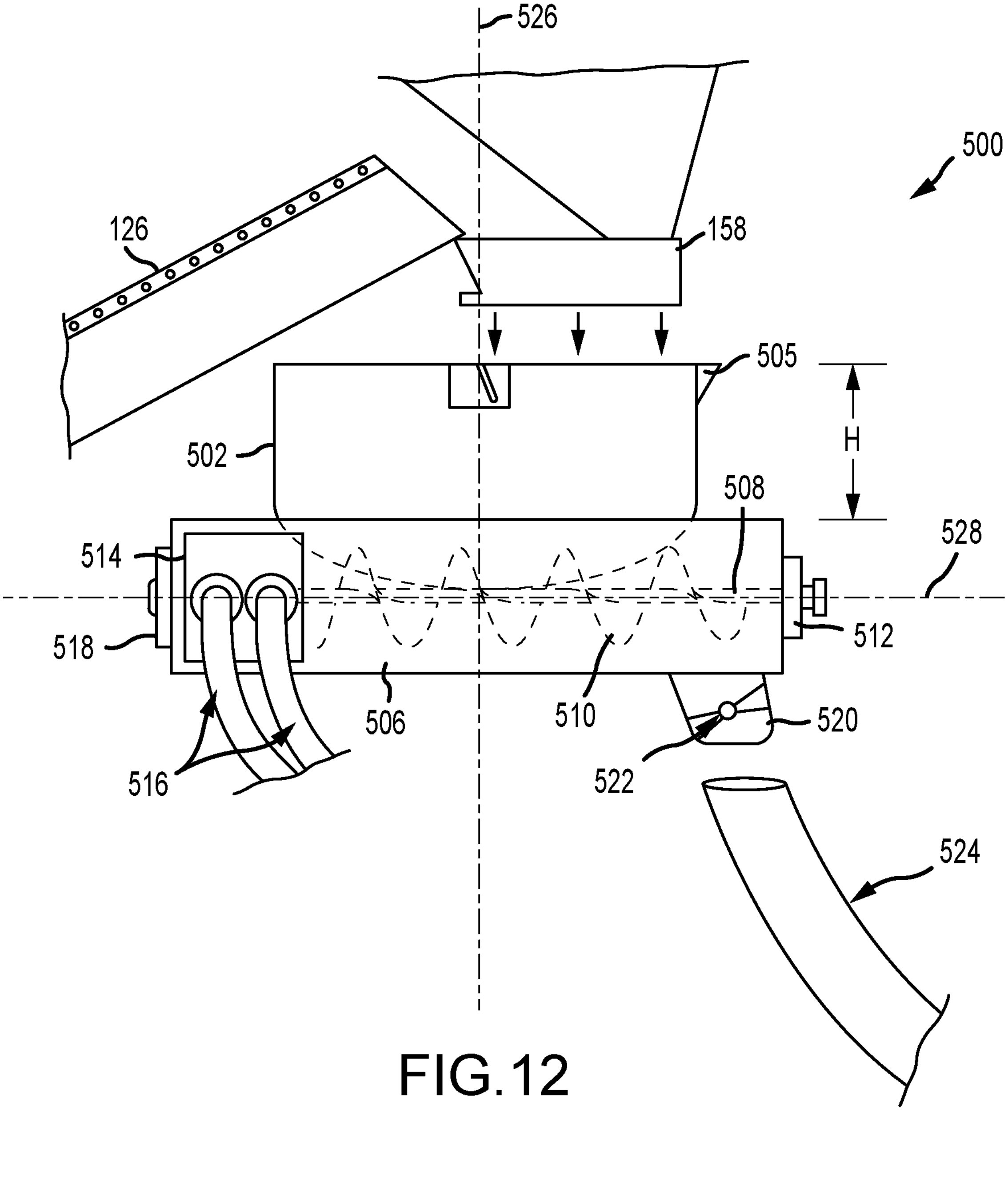
FIG. 12 is a side view of the hopper shown in FIG. 10.
Figure 13:
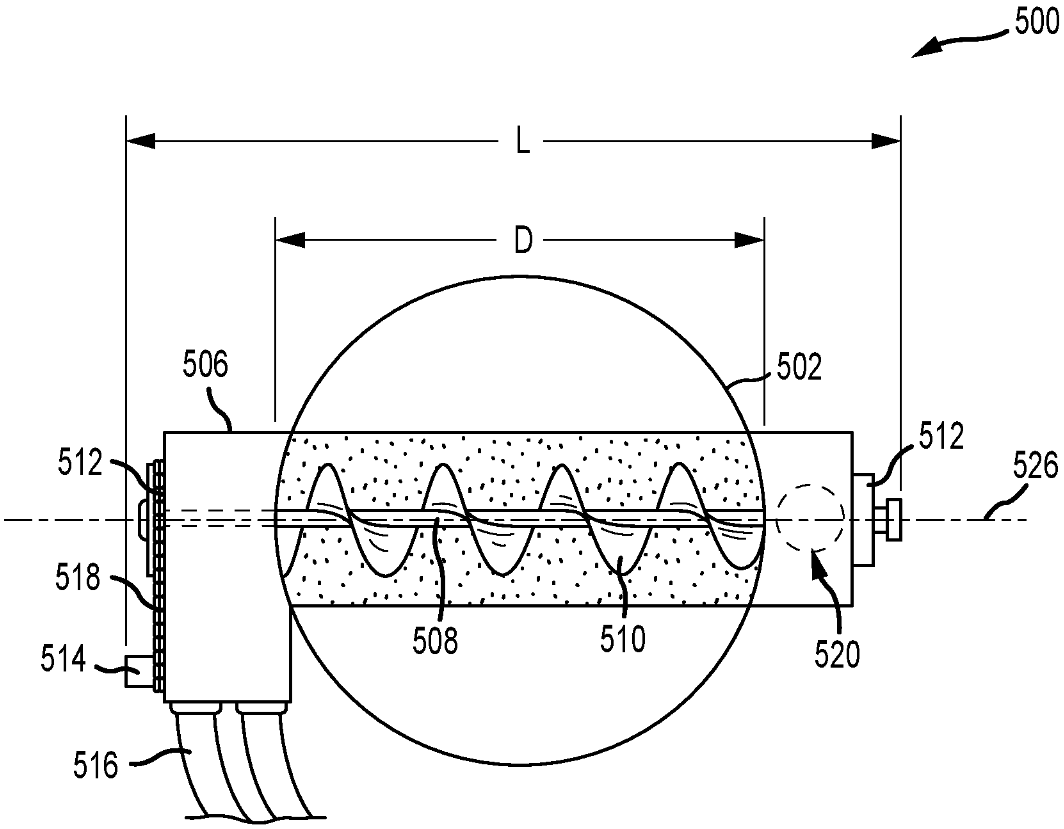
FIG. 13 is a top view of the hopper shown in FIG. 10.

FIG. 12 is a side view of the hopper 500. FIG. 13 is a top view of the hopper 500. Referring concurrently to FIGS. 12 and 13, the inlet chute 502 may be a substantially cylindrical chute extending along a longitudinal axis 526 and that is substantially vertical in direction. In an example, the inlet chute 502 may have a diameter D that is approximately 24 inches, while a height H of the inlet chute 502 may be approximately 8 inches. In some examples, the bracket 504 (shown in FIGS. 10 and 11) may enable the inlet chute 502 to rotate about the longitudinal axis 526 so that the orientation of the auger chute 506 may be adjustably positionable as described further below in reference to FIGS. 18 and 19.

The auger chute 506 may extend substantially perpendicular to the longitudinal axis 526 so that the auger chute 506 is oriented approximately horizontal in direction. In other examples, the auger chute 506 may be positioned at an angle relative to the horizontal direction. The rotatable shaft 508 extends along a rotation axis 528 which is different than the longitudinal axis 526. For example examples, the rotation axis 528 may be substantially parallel to the horizontal direction, while in other examples, the rotation axis 528 may be positioned at an angle relative to the horizontal direction. In an example, the rotatable shaft 508 extends for a length L that is approximately 34 inches. Opposite the motor 514, the outlet end 520 extends from the bottom of the auger chute 506. In the example, the outlet end 520 is offset from the inlet chute 502 along the rotation axis 528.

Figure 14:
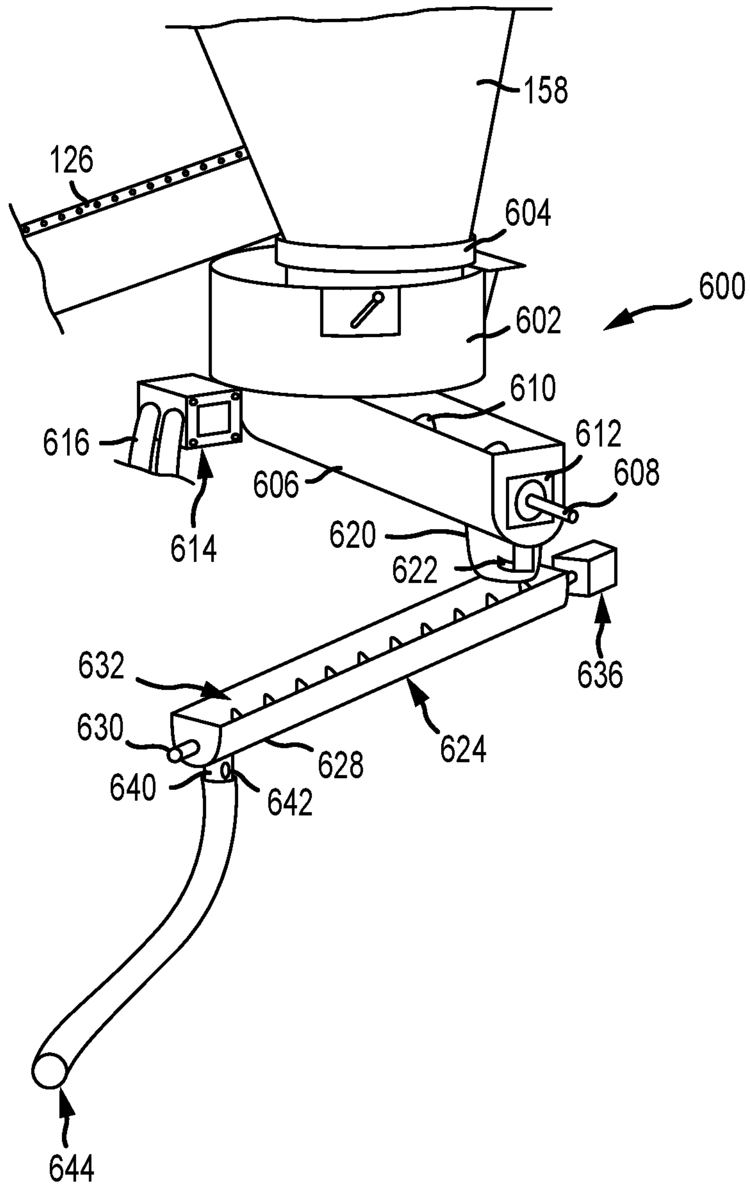
FIG. 14 is a perspective view of another horizontal hopper that may be used with the trench system shown in FIG. 1.
Figure 15:
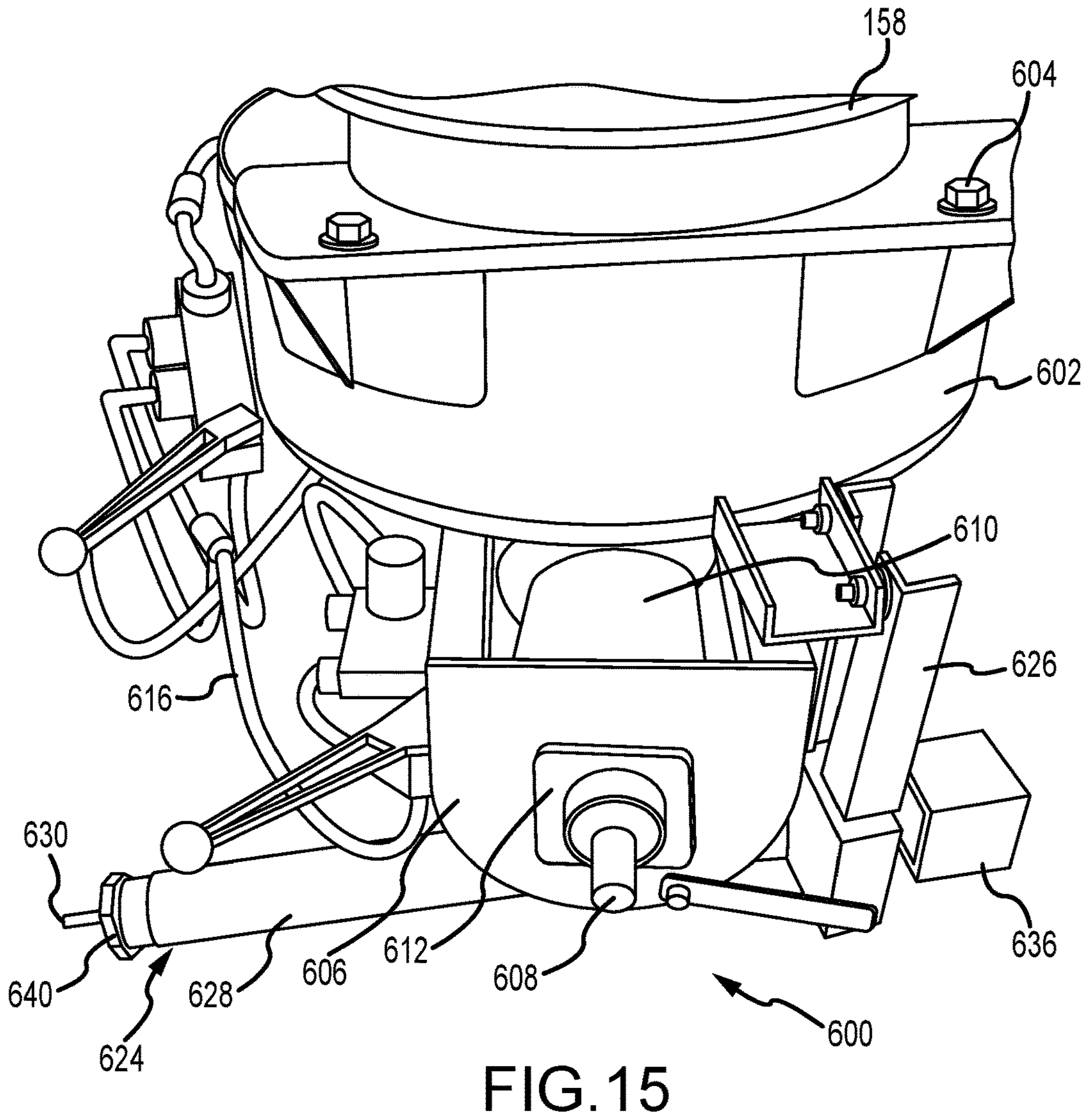
FIG. 15 is another perspective view of the hopper shown in FIG. 14.

FIG. 14 is a perspective view of another horizontal hopper 600 that may be used with the trench system 100 (shown in FIG. 1). FIG. 15 is another perspective view of the hopper 600. Referring concurrently to FIGS. 14 and 15 and similar to the example described above in FIGS. 10-13, the hopper 600 includes an inlet chute 602 that is removably coupled to the discharge chute 158 of an auger mixer 126 by a bracket 604. An elongated hopper auger chute 606 is coupled below and in flow communication with the inlet chute 602. A rotatable shaft 608 is mounted within the hopper auger chute 606 and includes an auger 610 coupled thereto. Both ends of the rotatable shaft 608 are supported on roller bearings 612 and the rotatable shaft 608 is powered by a hydraulic motor 614 via one or more hydraulic lines 616. An outlet end 620 is positioned opposite the motor 614 and in some examples includes a valve 622 for controlling mixture flow out of the hopper auger chute 606. However, in this example, a booster auger 624 is coupled in flow communication with the hopper auger chute 606 at the outlet end 620.

The booster auger 624 enables the flowable fill mixture to further agitate the mixture such that the mixture does not prematurely harden within the hopper 600 before being poured into the trench. Additionally, the booster auger 624 acts as a pump and enables the flowable fill mixture to be pressurized before being poured into the trench. The smaller sizes of nano and micro trenches induce more friction to the mixture pour along the trench sidewalls, and as such, gravity alone may not overcome the frictional forces needed to achieve a proper pour. By pressurizing the mixture pour into the trench, the mixture is ensured to properly fill all the voids within the trench without the need for additional compaction or vibration processes.

The outlet end 620 of the hopper auger chute 606 connects to the booster auger 624 and the booster auger 624 is coupled to the hopper auger chute 606 by a bracket 626. The booster auger 624 includes an elongated auger chute 628 that is fully enclosed (FIG. 14 illustrates a partial cut-away view of the booster auger 624). In alternative examples, the booster auger chute 628 may be open at top. A rotatable shaft 630 is mounted within the booster auger chute 628 and includes a single continuous flight auger 632 coupled thereto. In alternative examples, a paddle system or a double-auger system may additionally or alternatively be disposed within the booster auger chute 628 as required or desired. Additionally or alternatively, the booster auger 624 may be configured to rotate about the outlet end 620 as required or desired.

Both ends of the rotatable shaft 630 may be supported on bearings so as to restrain the shaft 630 laterally while enabling the shaft 630 to rotate. Additionally, the bearings enable the rotatable shaft 630 to be removed from the booster auger chute 628 so as to facilitate cleaning and disassembly of the booster auger 624. In the example, rotation of the shaft 630 may be driven by a hydraulic motor 636 that is powered by the volumetric mixing system's hydraulic system and may be controlled by the controller and/or hydraulic valves therein. For example, one or more hydraulic lines 638 (shown in FIG. 16) extend to the motor 636. In alternative examples, rotation of the shaft 630 may be powered by any other system that enables the booster auger 624 to function as described herein.

Opposite the motor 636, the booster auger chute 628 includes an outlet end 640 that may have a flow control valve 642, such as a ball-valve or a cut-off valve, which enables the discharge mixture flow out of the booster auger chute 628 to be controllable. In this example, a discharge hose 644 (shown in FIG. 14) is coupled to the outlet end 640 so that the flowable fill mixture 106 may be channeled from the booster auger 624 to an applicator (examples of which are described further below in reference to FIGS. 17-27) or directly poured into the trench. In an example, the valve 642 may be a camlock, quick-release coupler that is connectable to the rubber discharge hose 644. The valve 642 may be manually operable or coupled to the controller for operation. In operation, the hopper 600 continuously agitates the flowable fill mixture in both the hopper auger chute 606 and the booster auger 624 so that undesirable hardening of the mixture is reduced before it is poured into the trench.

Figure 16:
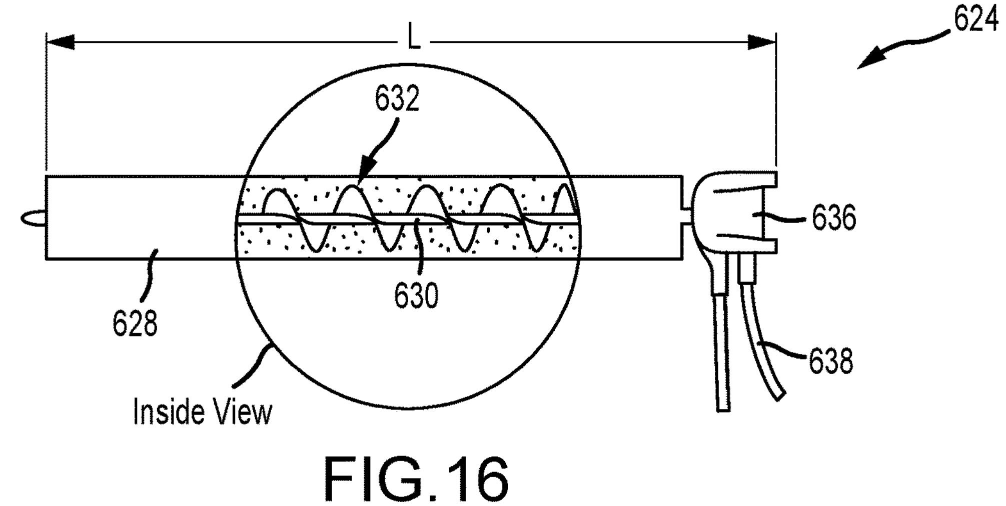
FIG. 16 is a detailed view of an auger that may be used with the hopper shown in FIG. 14.

FIG. 16 is a detailed view of the booster auger 624 that may be used with the hopper 600 (shown in FIGS. 14 and 15). In the example, the booster auger 624 has a length L that is approximately 19 inches and the auger 632 is approximately 2 inches in diameter. The booster auger 624 may be a smaller size than the hopper auger chute 606 (shown in FIGS. 14 and 15). Because the booster auger 624 is smaller in size, the mixture flow that is channeled therethrough increases in pressure so that the trench can be quickly backfilled without leaving any voids that would require any additional compaction and/or vibration.

Figure 17:
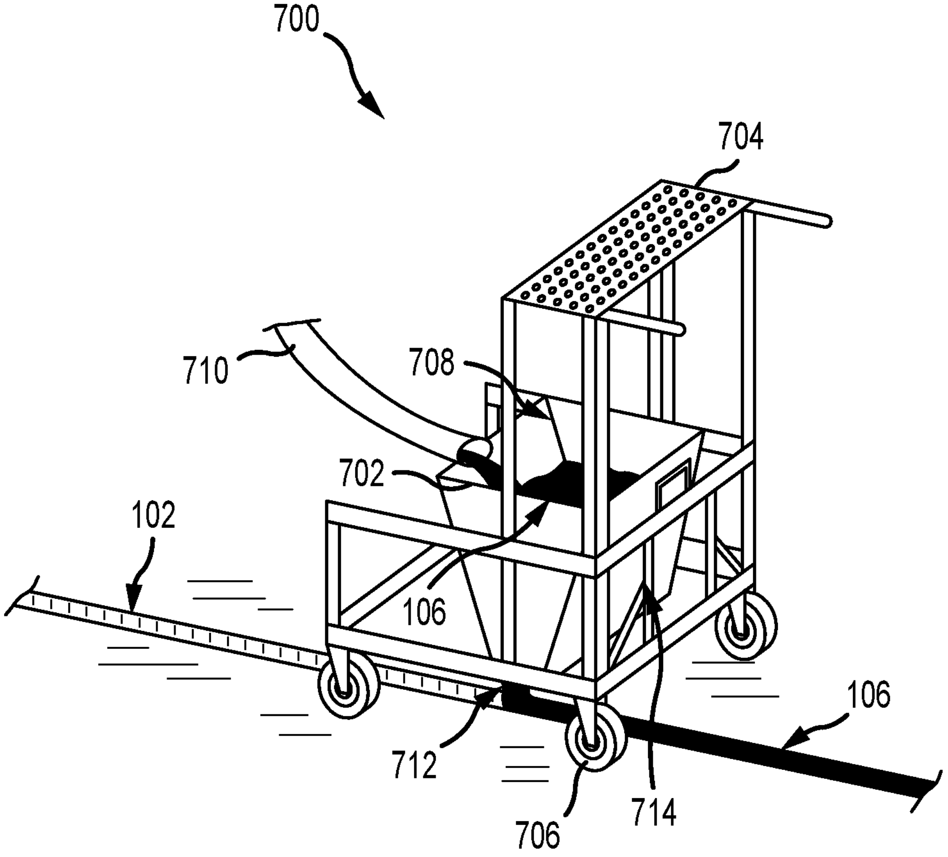
FIG. 17 is a perspective view of an applicator that may be used with the trench system shown in FIG. 1.

FIG. 17 is a perspective view of an applicator 700 that may be used with the trench system 100 (shown in FIG. 1). The applicator 700 includes a hopper 702 mounted on a frame 704 having a plurality of wheels 706. The hopper 702 is oriented in the vertical direction with regards to the trench 102. The hopper 702 has an inlet end 708 that is configured to receive the flowable fill mixture 106 from a discharge hose 710. In some examples, the inlet end 708 may include a clamp (not shown) to secure the discharge hose 710 to the hopper 702. The discharge hose 710 may extend from the horizontal hoppers described above in reference to FIGS. 10-16, the vertical hoppers described above in reference to FIGS. 4-8, and/or any other hopper as required or desired.

Opposite the inlet end 708, the hopper 702 is tapered towards an outlet end 712 that is configured to be positioned at least partially within, level with, or just above the trench 102. The hopper's height may be adjustable by an adjustment mechanism 714. The outlet end 712 may be substantially rectangular in shape and enable the flowable fill mixture 106 to be poured directly into the trench 102. In some examples, the outlet end 712 may include a cut-off device (not shown) configured to restrict and/or stop the flow of flowable fill mixture 106 out of the outlet end 712.

In the example, the applicator 700 is manually pushed behind the volumetric mixing system by an operator while the flowable fill mixture 106 is channeled into the hopper 702. The outlet end 712 is shaped and sized to pour the flowable fill mixture 106 directly into the trench 102 so that air-voids are reduced in the backfill and without a significant amount of overfill. As such, the amount of post backfill mixture manipulation (e.g., compaction and/or vibration) and clean-up is reduced, thereby enabling backfilling of the trench 102 in a single pass. In alternative embodiments, the applicator 700 may include a motor so that it can be self-propelled.

Additionally, the applicator 700 may be utilized to pour a sealant into the trench 102 and on top of the flowable fill mixture 106. For example, after the flowable fill mixture 106 is poured into the trench 102, the applicator 700 may be used on a second pass over and along the trench 102 to pour the sealant. Similar to the pour of the flowable fill mixture 106, the applicator 700 enables the sealant is poured directly into the trench 102 to reduce clean-up.

Figure 18:
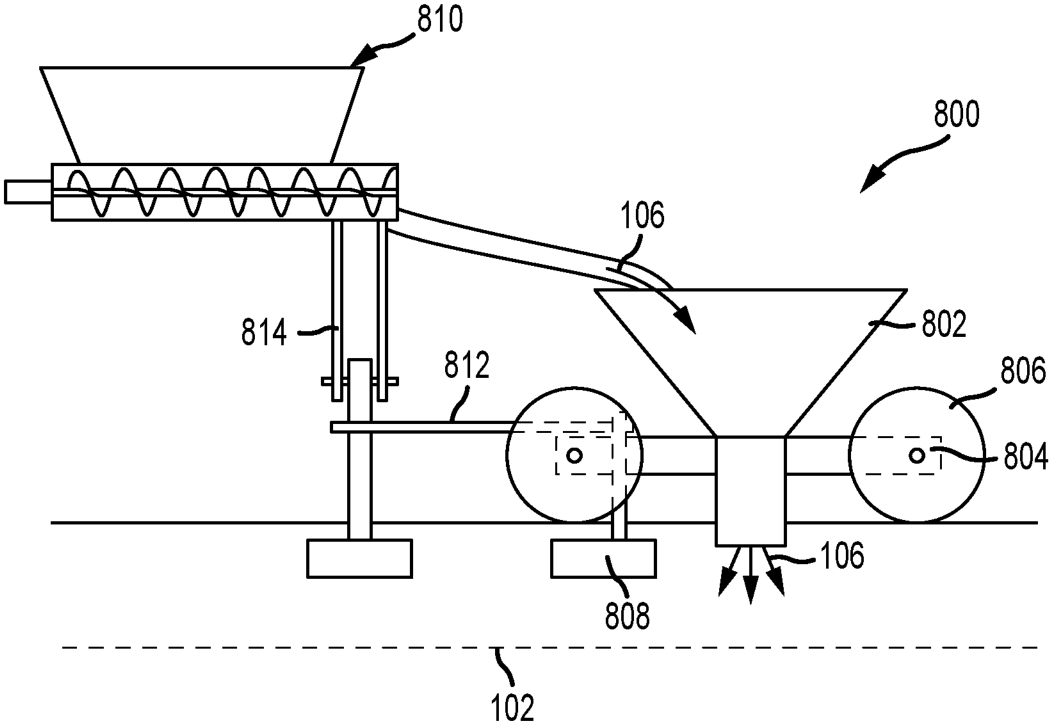
FIG. 18 is a side view of another applicator that may be used with the trench system shown in FIG. 1.
Figure 19:
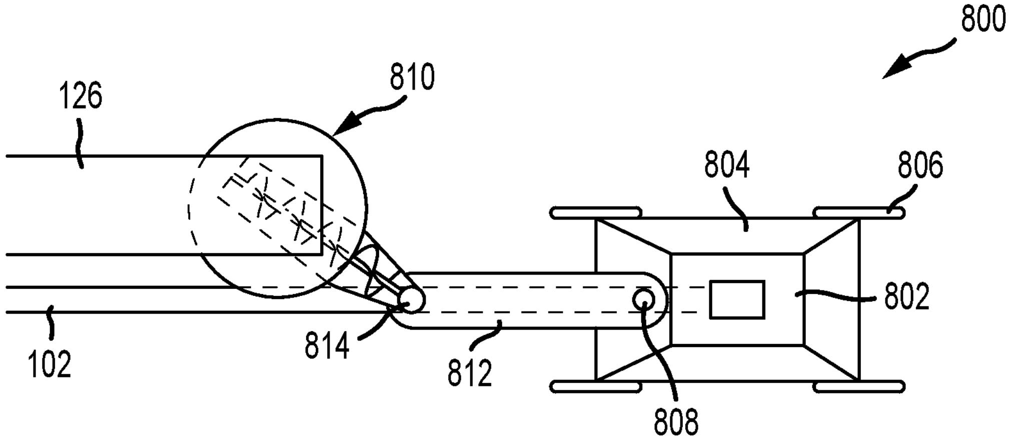
FIG. 19 is a top view of the applicator shown in FIG. 18.

FIG. 18 is a side view of another applicator 800 that may be used with the trench system 100 (shown in FIG. 1). FIG. 19 is a top view of the applicator 800. Referring concurrently to FIGS. 18 and 19, the applicator 800 includes a hopper 802 mounted on a frame 804 having a plurality of wheels 806 as described above in reference to FIG. 17. However, in this example, the applicator 800 is configured to be towed behind the volumetric mixing system so that an operator does not have to manually push the applicator 800. This system is more cost effective to build and operate since it readily follows the volumetric mixing system and requires no fuel and no separate operator. In alternative examples, a video camera and/or cab-mounted monitor may be used to monitor the flowable fill mixture 106 at the applicator 800, and the speed of the applicator 800, without an operator positioned at the trench 102.

In this example, the applicator 800 includes at least one adjustable height guide shoe 808 coupled to the frame 804. The guide shoe 808 is sized and shaped to extend at least partially within the trench 102. In operation, as the applicator 800 is towed along the trench 102, the guide shoe 808 is positioned in front of the hopper 802 to keep the hopper 802 centered and aligned with the trench 102, even if the trench 102 in not linear, so that the flowable fill mixture 106 or a sealant may be poured directly into the trench 102. The applicator 800 is coupled to a hopper device 810 by a pivotable tow bar 812. The hopper device 810 may be the horizontal hoppers described above in reference to FIGS. 10-16, the vertical hoppers described above in reference to FIGS. 4-8, and/or any other hopper as required or desired.

The hopper device 810 also includes an adjustable height guide shoe 814, which the tow bar 812 is coupled to, that keeps the hopper device 810 centered and aligned with the trench 102. Because part of the hopper device 810 is also always aligned with the trench 102, the hopper device 810 is coupled to the auger mixer 126 such that it is freely rotatable and the guide shoe 814 is able to follow the contours of the trench 102. In some examples, the entire hopper device 810 may rotate, while in other examples, it may be only the auger chute of the hopper device that rotates.

Figure 20:
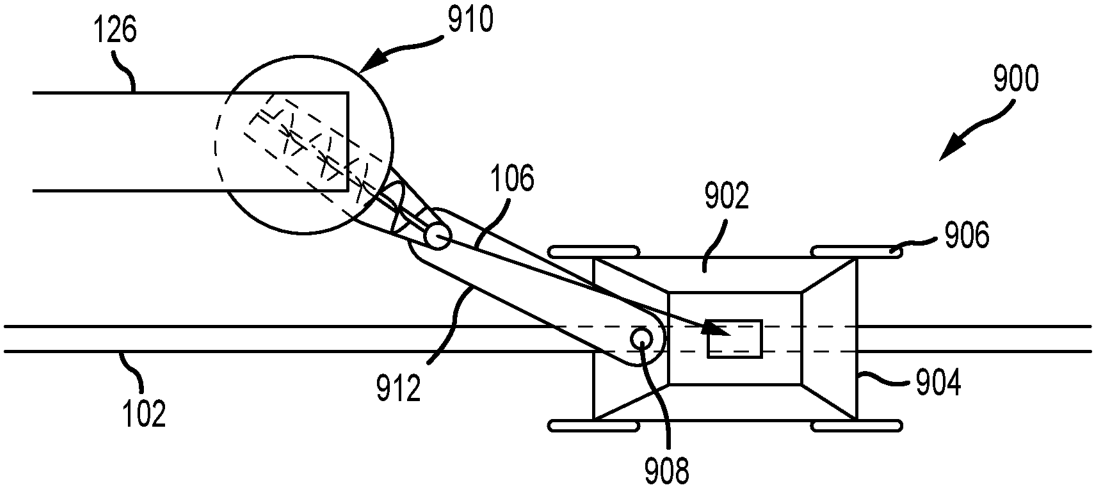
FIG. 20 is a top view of another applicator that may be used with the trench system shown in FIG. 1.

FIG. 20 is a top view of another applicator 900 that may be used with the trench system 100 (shown in FIG. 1). The applicator 900 includes a hopper 902 mounted on a frame 904 having a plurality of wheels 906 and is configured to be towed behind the volumetric mixing system as described above in reference to FIGS. 18 and 19. However, in this example, a guide shoe 908 coupled to the frame 904 is coupled directly to a hopper device 910 by a pivotable tow bar 912. Here, the auger mixer 126 may be configured to free-swing so that the hopper 902 is allowed to be centered and aligned with the trench 102 for pouring the flowable fill mixture 106 or sealant directly into the trench 102, while still following the contours of the trench.

Figure 21:
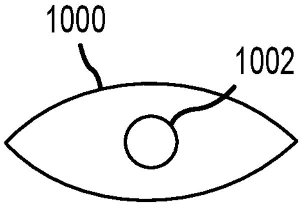
FIG. 21 is a top view of a guide shoe that may be used with the applicators shown in FIGS. 18-20.

FIG. 21 is a top view of a guide shoe 1000 that may be used with the applicators 800, 900 (shown in FIGS. 18-20). The guide shoe 1000 may be supported by an adjustable post 1002 that extends from the applicator frame and/or hopper device so that the guide shoe 1000 can ride above the newly installed fiber optic cables without causing any damage thereto. The guide shoe 1000 is substantially almond-shaped and is sized to extend at least partially into a trench and be used as a guide. As such, the attached applicator and/or hopper device can follow along the contours of the trench without an operator to drive the applicator. The guide shoe 1000 is positioned in front of the backfill pour so that it does not disturb the freshly poured backfill mixture.

Figure 22:
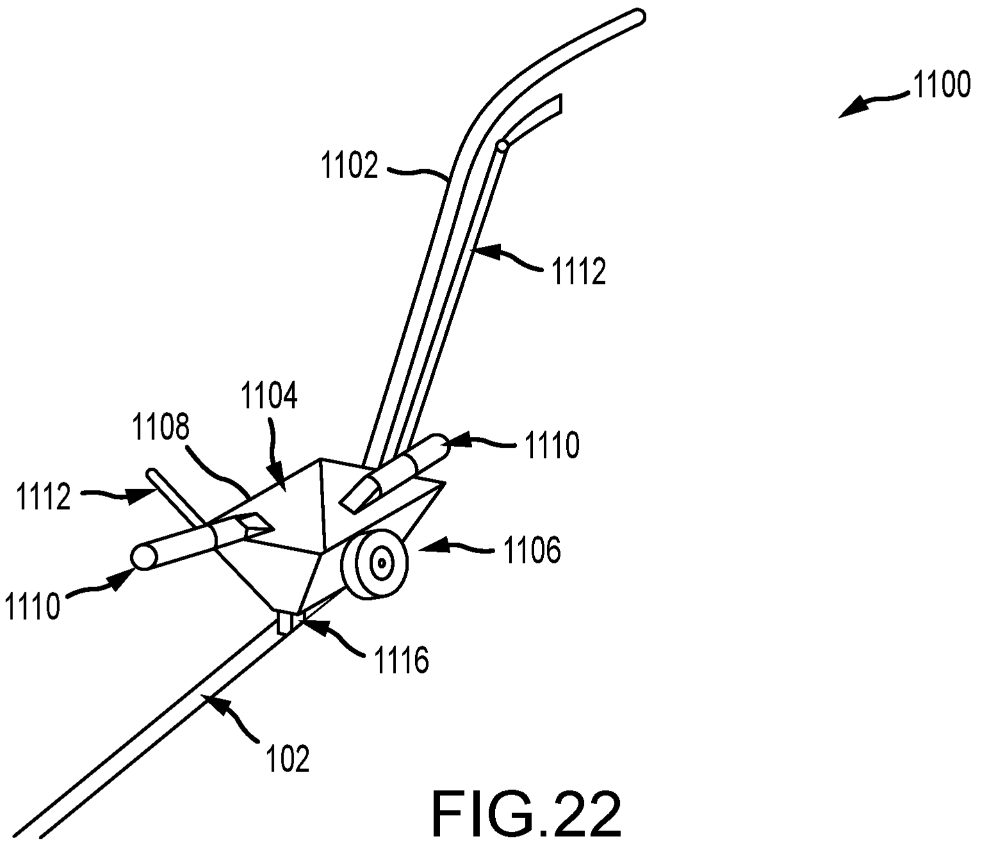
FIG. 22 is a perspective view of another applicator that may be used with the trench system shown in FIG. 1.
Figure 23:
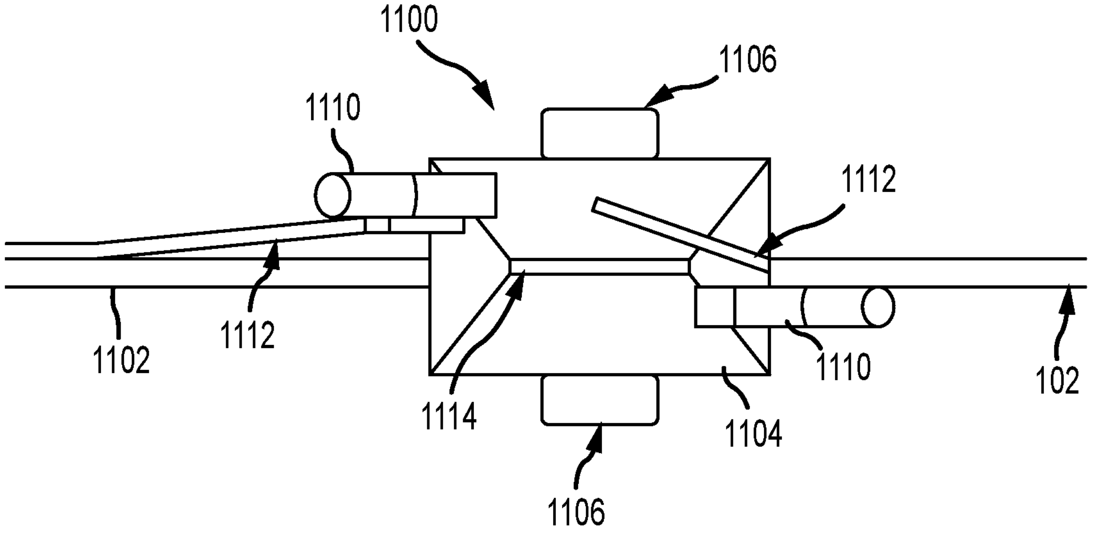
FIG. 23 is a top view of the applicator shown in FIG. 22.

FIG. 22 is a perspective view of another applicator 1100 that may be used with the trench system 100 (shown in FIG. 1). FIG. 23 is a top view of the applicator 1100. Referring concurrently to FIGS. 22 and 23, the applicator 1100 is configured to be coupled in flow communication with a discharge hose of a hopper device (not shown) such as the horizontal hoppers described above in reference to FIGS. 10-16, the vertical hoppers described above in reference to FIGS. 4-8, and/or any other hopper as required or desired. The applicator 1100 includes a handle 1102 such that the applicator 1100 may be manually pushed behind the volumetric mixing system. In alternative examples, the applicator 1100 may be towed or be self-propelled as described above.

The applicator 1100 includes a hopper 1104 mounted on one or more wheels 1106. Each wheel may have independent springs so that the hopper 1104 may maintain its position over the trench 102 even with an uneven surface structure. The hopper 1104 is oriented in the vertical direction with regards to the trench 102. The hopper 1104 has an inlet end 1108 that is configured to receive the flowable fill mixture from the discharge hose. The inlet end 1108 includes one or more hose connectors 1110 that enable the discharge hose to be secured to the hopper 1104. Each hose connectors 1110 may also include a cut-off device 1112 that enables control of the flowable fill mixture into the hopper 1104 from the attached discharge hose. In the example, the hose connectors 1110 are positioned both on the front and on the rear of the applicator 1100 so that the discharge hose can be coupled to the hopper 1104 while being pushed or pulled behind the volumetric mixing system.

Opposite the inlet end 1108, the hopper 1104 is tapered towards an outlet end 1114 which has a smaller cross-sectional area and that is configured to be positioned at least partially within, level with, or just above the trench 102. The outlet end 1114 may be substantially rectangular in shape and enable the flowable fill mixture to be poured into the trench 102. In alternative examples, the outlet end 1114 may have any size and/or shape that enables the applicator 1100 to function as described herein. Proximate the outlet end 1114, a guide pin 1116 extends from the hopper 1104 and is shaped and sized to extend at least partially into the trench 102 and be used as a guide as described above.

Additionally, the applicator 1100 may be utilized to pour a sealant into the trench 102 and on top of the flowable fill mixture. For example, after the flowable fill mixture is poured into the trench 102, the applicator 1100 may be used on a second pass over and along the trench 102 to pour the sealant. Similar to the pour of the flowable fill mixture, the applicator 1100 enables the sealant is poured directly into the trench 102 to reduce clean-up.

Figure 24:
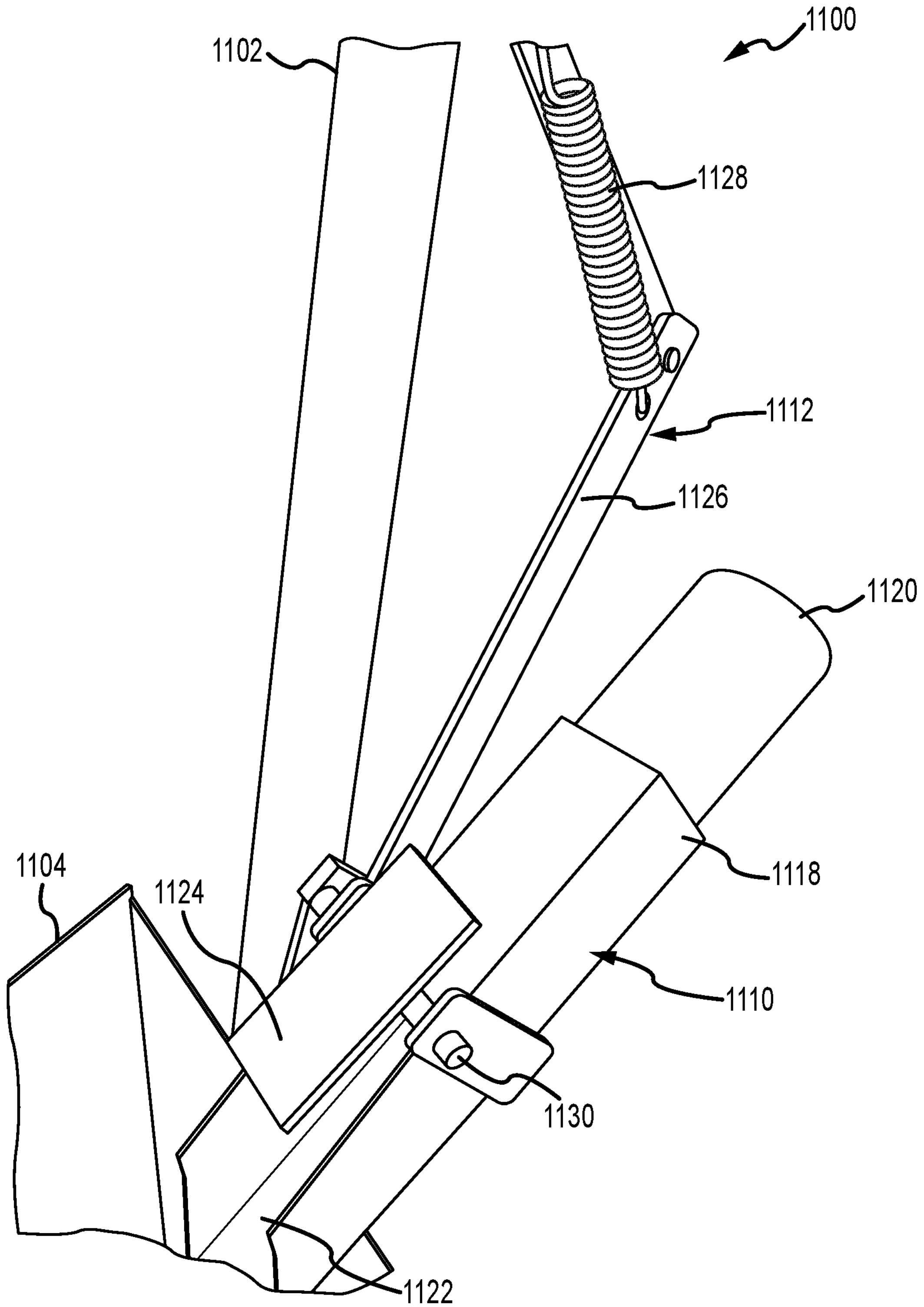
FIG. 24 is a detailed perspective view of a hose connector that may be used with the applicator shown in FIG. 22.

FIG. 24 is a detailed perspective view of the hose connector 1110. In this example, the hose connector 1110 includes a channel 1118 having an inlet end 1120 and an outlet end 1122. The channel 1118 is secured to the hopper 1104 and is configured to receive a discharge hose and channel the flowable fill mixture into the hopper 1104. In the example, the inlet end 1120 is substantially circular to facilitate coupling to the round discharge hose, and the outlet end 1122 is substantially square to facilitate securing the channel 1118 to the hopper 1104. In alternative examples, the channel 1118 may have any other shape as required or desired. Because flow control of the flowable fill mixture into the trench is desirable, the cut-off device 1112 is positioned at the outlet end 1122 of the hose connector 1110 so that the flowable fill mixture may quickly be stopped. As such, overflow of backfill mixture from the applicator and the trench is reduced.

The cut-off device 1112 includes a plate 1124 that is sized and shaped to completely cover the outlet end 1122 of the hose connector 1110. The plate 1124 may be actuatable between at least an open position (as illustrated), which enables the flowable fill mixture to be channeled into the hopper 1104, and a closed position, which covers the outlet end 1122 and prevents the flowable fill mixture from flowing into the hopper 1104. In other examples, the plate 1124 may have one or more intermediate positions in regards to the outlet end 1122 to further control the flow of flowable fill mixture into the hopper 1104 as required or desired. The plate 1124 is coupled to one or more link arms 1126 that the operator may use to actuate the plate 1124. The link arms 1126 may be biased by a biasing element 1128 (e.g., a spring) in the open position. In the example, upon actuation of the link arms 1126, the plate 1124 rotates into the closed position about an axle 1130. In other examples, the plate may slide into the closed position. Additionally, by placing the hose connector 1110 at the inlet end 1108 of the hopper 1104, the flowable fill mixture is required to drop down to the outlet end 1114 of the hopper 1104 further providing some passive agitation to the mixture to prevent hardening before being poured into the trench.

Figure 25:
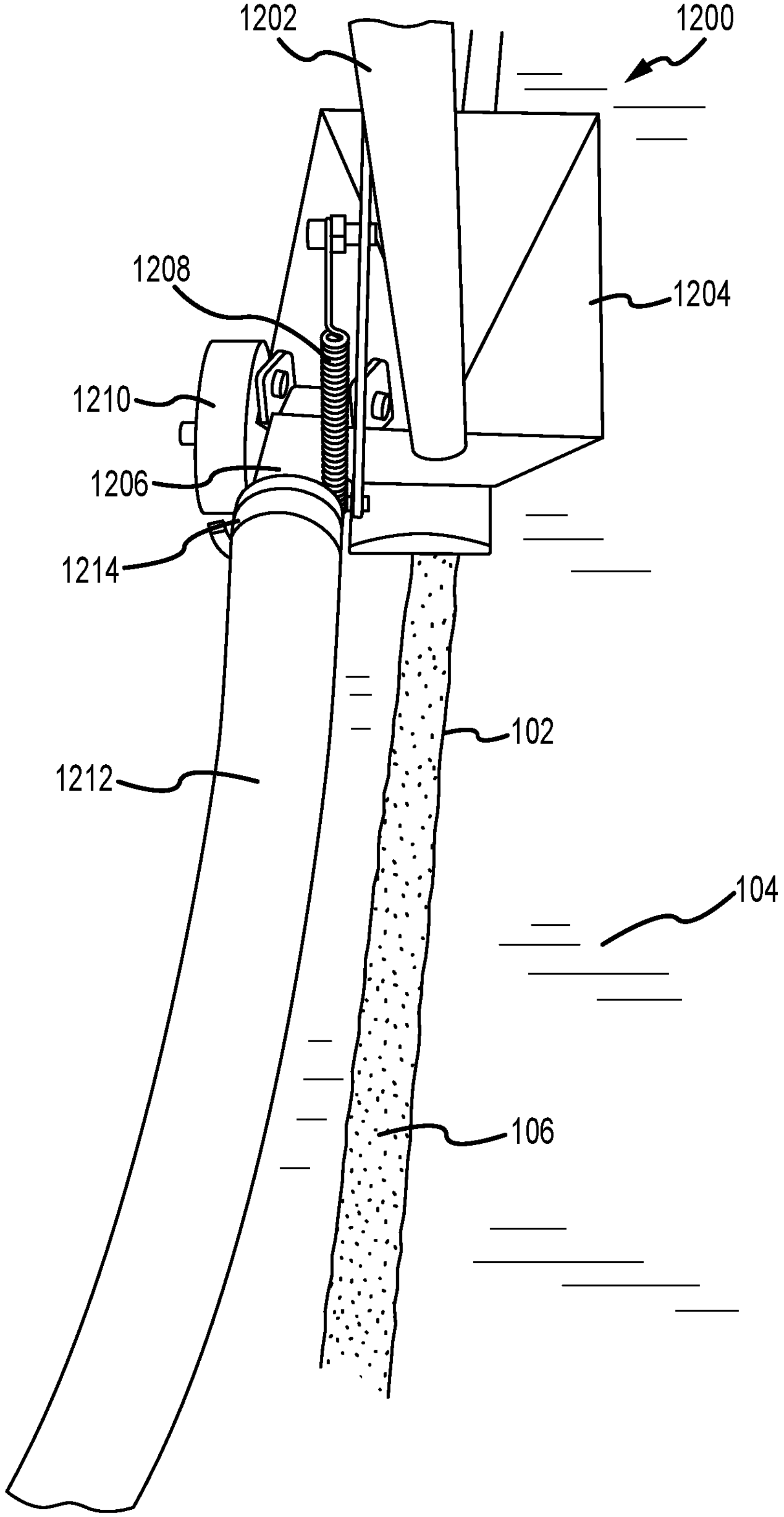
FIG. 25 is a perspective view of another applicator that may be used with the trench system shown in FIG. 1.

FIG. 25 is a perspective view of another applicator 1200 that may be used with the trench system 100 (shown in FIG. 1). In this example, the applicator 1200 includes a handle 1202 (such that the applicator may be manually pushed behind the volumetric mixing system), a hopper 1204, a hose connector 1206, and a cut-off device 1208 as described above in reference to FIGS. 22-24. However, in this example, the hopper 1204 includes only a single wheel 1210. As such, a portion of the outlet end of the hopper 1204 may slide across the surface structure 104 and level the flowable fill mixture 106 or a sealant poured into the trench 102. In some examples, the hopper 1204 may include a leveling extension (not shown) that extends from the bottom of the hopper 1204 proximate the rear of the outlet end. The leveling extension may extend a predetermined depth into the trench 102 so as to level the flowable fill mixture 106 to a level that is below the surface structure 104. This enables a layer of sealant, for example, a ¾ inch layer of sealant, to cover the backfill mixture. Also illustrated in this example, a flexible discharge hose 1212 may be coupled to the hose connector 1206 by a hose clamp 1214.

Figure 26:
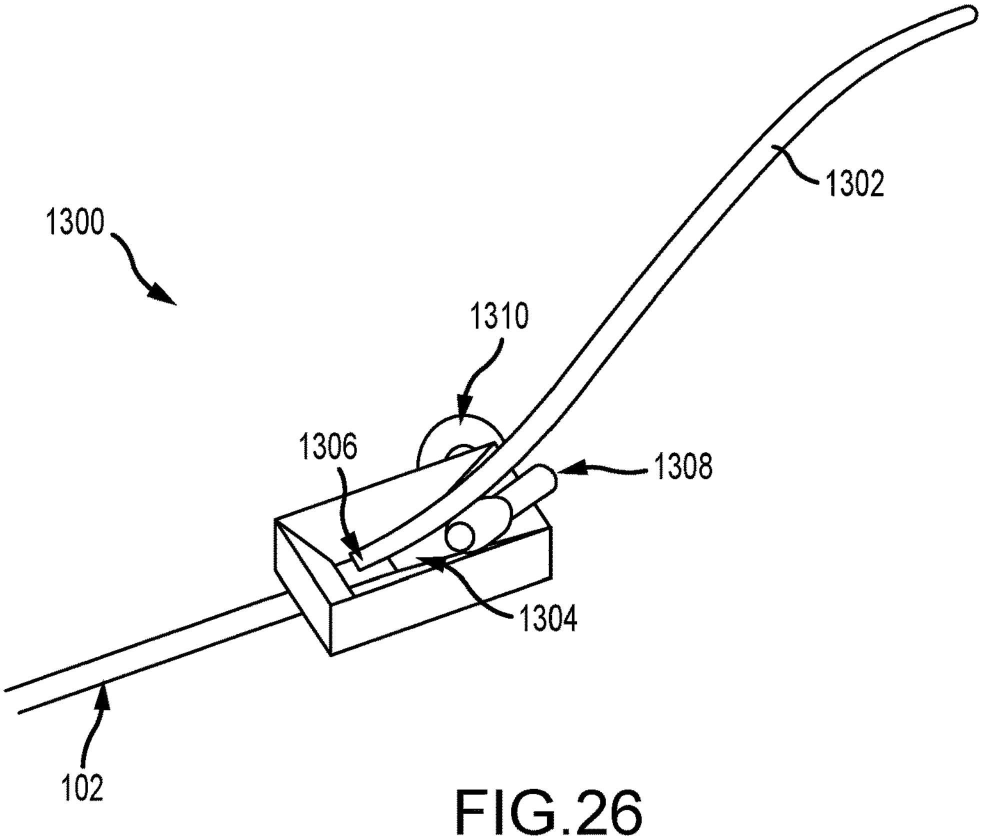
FIG. 26 is a perspective view of another applicator that may be used with the trench system shown in FIG. 1.

FIG. 26 is a perspective view of another applicator 1300 that may be used with the trench system 100 (shown in FIG. 1). In this example, the applicator 1300 includes a handle 1302 (such that the applicator may be manually pushed behind the volumetric mixing system), a hopper 1304 with an outlet end 1306, a hose connector 1308, and a single wheel 1310 as described above in reference to FIG. 25. However, in this example, the hopper 1304 is substantially rectangular-box-shaped. This hopper 1304 is smaller in size than the examples described above so it is easier to transport and can enable use in tighter working spaces. Additionally, the hopper 1304 holds less flowable fill mixture so that once the mixture flow is stopped there is less clean-up required. In some examples, a cut-off device (not shown) may be coupled to the hose connector 1308.

Figure 27:
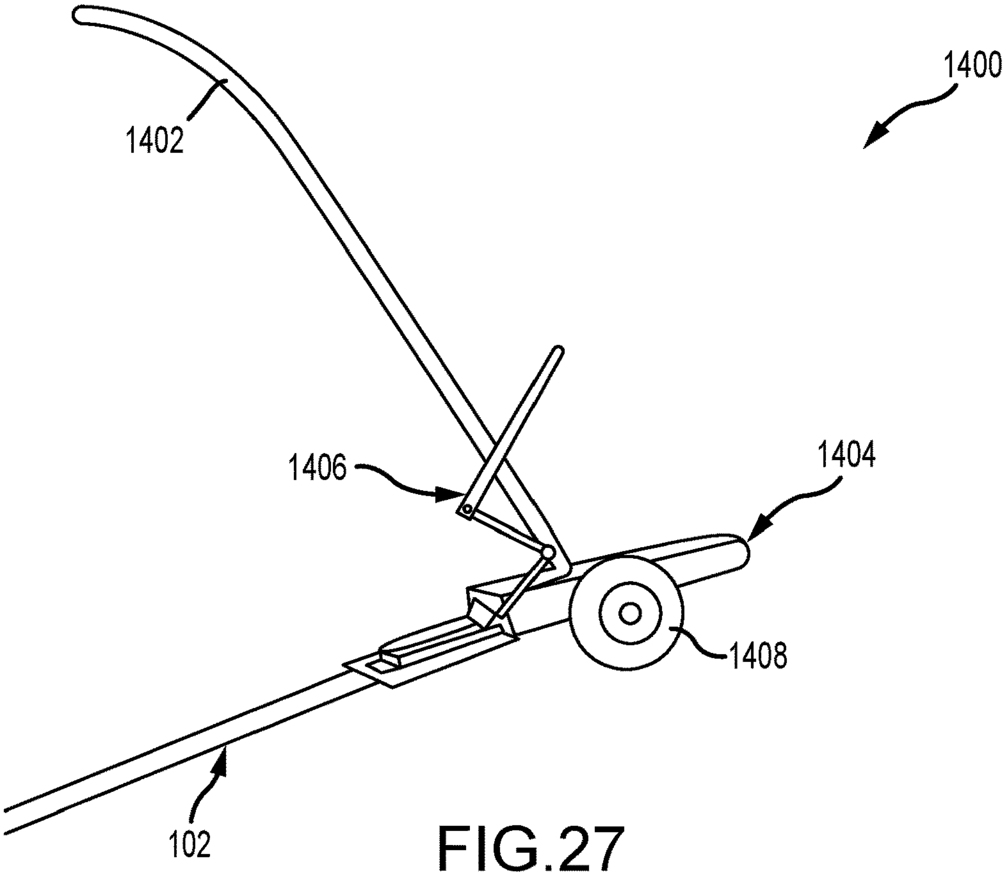
FIG. 27 is a perspective view of another applicator that may be used with the trench system shown in FIG. 1.

FIG. 27 is a perspective view of another applicator 1400 that may be used with the trench system 100 (shown in FIG. 1). The applicator 1400 includes a handle 1402 (such that the applicator may be manually pushed behind the volumetric mixing system), and a hose connector 1404 with a cut-off device 1406 mounted on one or more wheels 1408. In this example, the hose connector 1404 enables the flowable fill mixture or a sealant to be poured directly into the trench 102 from the discharge hose without the use of another hopper. This enables a pressurized mixture flow to maintain its pressurization until being poured into the trench 102. Additionally, this reduces clean-up around the trench 102 of excess flowable fill mixture because it is easier to direct the mixture flow directly into the trench 102.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. For example, the vibrating aggregate screen and/or aggregate storage bin may also include a hydraulic lift and one or more pivots so as to dispose the large aggregate particles into the large particle-storage chamber. Numerous other changes may be made which will readily suggest themselves to those skilled in the art and which are encompassed in the spirit of the disclosure and as defined in the appended claims.

What is claimed is:

1. A method of mixing a cement-based mixture comprising:

excavating a trench within a surface structure, wherein the excavation of the trench produces trench spoils;

collecting the trench spoils at a mobile volumetric mixing system having a water-storage chamber, a cement-storage chamber, and an aggregate-storage chamber, wherein the trench spoils are collected in the aggregate-storage chamber;

channeling the trench spoils from the aggregate-storage chamber to a conveyor disposed below the aggregate-storage chamber;

screening the trench spoils through an aggregate screen positioned between the aggregate-storage chamber and the conveyor;

transporting the screened trench spoils along the conveyor to an auger mixer;

mixing the screened trench spoils with water from the water-storage chamber and cement from the cement-storage chamber at the auger mixer to form a flowable fill mixture; and backfilling the trench with the flowable fill mixture.

2. The method of claim 1, wherein screening the trench spoils includes vibrating the aggregate screen.

3. The method of claim 1, wherein collecting the trench spoils includes vacuuming the trench spoils from a trenching machine and transporting the vacuumed trench spoils through a flexible hose towards the aggregate-storage chamber.

4. The method of claim 1, wherein mixing the screened trench spoils with the water and the cement includes mixing one or more admixtures into the flowable fill mixture.

5. The method of claim 1, further comprising collecting large particles screened by the aggregate screen in a large particle-storage chamber.

6. The method of claim 1, further comprising after forming the flowable fill mixture, flowing flowable fill mixture through a hopper and then into an applicator for backfilling the trench.

7. The method of claim 1, wherein excavating the trench and backfilling the trench occurs in a single pass over the surface structure.

8. The method of claim 1, wherein the trench is a micro-trench.

9. A method of mixing a cement-based mixture comprising:

drawing aggregate into an aggregate-storage chamber from an external source by a suction system;

channeling the aggregate from the aggregate-storage chamber to a conveyor disposed below the aggregate-storage chamber;

screening the aggregate through a vibrating aggregate screen positioned between the aggregate-storage chamber and the conveyor;

transporting the aggregate along the conveyor to an auger mixer; and mixing the aggregate with water from a water-storage chamber and cement from a cement-storage chamber at the auger mixer to form a flowable fill mixture.

10. The method of claim 9, further comprising collecting large particles screened by the vibrating aggregate screen from the aggregate channeled from the aggregate-storage chamber in a large particle-storage chamber.

11. The method of claim 9, wherein channeling the aggregate from the aggregate-storage chamber to the conveyor comprises tilting the aggregate-storage chamber about one or more pivots above the vibrating aggregate screen.

12. The method of claim 11, wherein the aggregate-storage chamber comprises a lift configured to tilt the aggregate-storage chamber about the one or more pivots to channel the aggregate towards the vibrating aggregate screen.

13. The method of claim 9, wherein drawing the aggregate into the aggregate-storage chamber comprises collecting trench spoils ejected from a trenching machine by a vacuum device of the suction system that is coupled to a hose extending between the trenching machine and the aggregate-storage chamber.

14. The method of claim 13, further comprising installing fiber optic cables within a trench excavated by the trenching machines.

15. The method of claim 9, further comprising loading the flowable fill mixture into a hopper configured to agitate the flowable fill mixture.

16. The method of claim 15, further comprising channeling the flowable fill mixture from the hopper to an applicator.

17. The method of claim 9, wherein the aggregate-storage chamber, the suction system, the conveyor, the vibrating aggregate screen, the water-storage chamber, and the cement-storage chamber are part of a mobile volumetric mixing system.

18. The method of claim 9, wherein the suction system comprises a vacuum device and a filtration system.

* * * * *